United States Patent
Liu et al.

(10) Patent No.: US 11,382,113 B2
(45) Date of Patent: Jul. 5, 2022

(54) SYSTEMS AND METHODS FOR UPLINK DATA SCHEDULING IN WIRELESS COMMUNICATION SYSTEMS

(71) Applicant: QUALCOMM INCORPORATED, San Diego, CA (US)

(72) Inventors: Haiqin Liu, San Diego, CA (US); Gang Xiao, San Diego, CA (US); Peng Wu, Shanghai (CN); Arvind Santhanam, San Diego, CA (US); Saket Bathwal, Hyderabad (IN); Rudhir Upretee, San Diego, CA (US); Xing Chen, San Diego, CA (US); Xiaojian Long, San Diego, CA (US); Shailesh Maheshwari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/966,140

(22) PCT Filed: Mar. 8, 2018

(86) PCT No.: PCT/CN2018/078410
§ 371 (c)(1),
(2) Date: Jul. 30, 2020

(87) PCT Pub. No.: WO2019/169598
PCT Pub. Date: Sep. 12, 2019

(65) Prior Publication Data
US 2021/0029725 A1 Jan. 28, 2021

(51) Int. Cl.
*H04W 72/12* (2009.01)
*H04W 72/04* (2009.01)
(Continued)

(52) U.S. Cl.
CPC ... *H04W 72/1252* (2013.01); *H04W 72/0486* (2013.01); *H04W 72/10* (2013.01); *H04W 72/14* (2013.01)

(58) Field of Classification Search
CPC ......... H04W 72/1252; H04W 72/1257; H04W 72/0486; H04W 72/10; H04W 72/14
See application file for complete search history.

(56) References Cited

U.S. PATENT DOCUMENTS

| 2013/0064229 A1* | 3/2013 | Gidlund | H04W 28/065 370/336 |
| 2017/0019887 A1 | 1/2017 | Jiang et al. | |

(Continued)

FOREIGN PATENT DOCUMENTS

| KR | 20170093693 A | 8/2017 |
| WO | 2017135881 A1 | 8/2017 |
| WO | 2018009293 A1 | 1/2018 |

OTHER PUBLICATIONS

Oppo, Discussion on SPS Enhancements for V2V, 3GPP TSG-RAN2 Meeting #93bis R2-162197, Apr. 11-15, 2016 (Year:2016).*

(Continued)

*Primary Examiner* — Asghar H Bilgrami

(57) ABSTRACT

In wireless communication, uplink communication by a wireless communication system user equipment may include providing data packets by a data source in the user equipment, detecting a pattern relating to uplink transmission of the plurality of data packets, and scheduling transmission of the plurality of data packets by the user equipment. One or more aspects of scheduling transmission of the plurality of data packets may be based on the detected pattern.

20 Claims, 24 Drawing Sheets

(51) Int. Cl.
*H04W 72/10* (2009.01)
*H04W 72/14* (2009.01)

(56) References Cited

U.S. PATENT DOCUMENTS

| 2018/0014284 A1 | 1/2018 | Yi et al. |
| 2018/0020387 A1* | 1/2018 | Van Der Velde ............................ H04W 36/0072 |
| 2018/0176926 A1* | 6/2018 | Xu .................... H04W 72/0486 |
| 2018/0199251 A1* | 7/2018 | Kim .................... H04W 72/042 |
| 2020/0128436 A1* | 4/2020 | Chae ................. H04W 72/1284 |

OTHER PUBLICATIONS

Huawei, HiSilicon: "On eV2X Evaluation Methodology," R1-1801365, 3GPP TSG RAN WG1 Meeting #92, R1-1801365, Mar. 2, 2018, 7 pages.

International Search Report and Written Opinion—PCT/CN2018/078410—ISA/EPO—dated Nov. 28, 2018.

OPPO: "Discussion on SPS Enhancements for V2V," 3GPP TSG-RAN2 Meeting #93bis R2-162197, Apr. 15, 2016, 3 pages.

"3rd Generation Partnership Project; Technical Specification Group Radio Access Network; Study on LTE-based V2X Services; (Release 14)", 3GPP Standard, 3GPP TR 36.885, 3rd Generation Partnership Project (3GPP), Mobile Competence Centre, 650, Route Des Lucioles, F-06921, Sophia-Antipolis Cedex, France, vol. RAN WG1, No. V14.0.0, Jul. 20, 2016 (Jul. 20, 2016), pp. 1-216, XP051295325, [retrieved on Jul. 20, 2016], abstract, p. 14-p. 24.

Supplementary European Search Report—EP18909033—Search Authority—Munich—dated Oct. 14, 2021.

* cited by examiner

SYSTEMS AND METHODS FOR UPLINK DATA SCHEDULING IN WIRELESS COMMUNICATION SYSTEMS

TECHNICAL FIELD

The present disclosure relates to wireless communication systems and, more particularly, to scheduling uplink data transmissions from user equipment.

INTRODUCTION

Wireless communication devices, sometimes referred to as user equipment, may communicate with a base station or may communicate directly with another user equipment. When a user equipment communicates directly with another user equipment, the communication is referred to as device-to-device (D2D) communication. In particular use cases, a user equipment may be a wireless communication device, such as a portable cellular device, or may be a vehicle, such as an automobile, or may be any other connected device.

When the UE is a vehicle, such as an automobile, the D2D communication may be referred to as vehicle-to-vehicle (V2V) communication. Other vehicle-based user equipment communications may include vehicle-to-everything (V2X), which may include V2V, vehicle-to-infrastructure (V2I), vehicle-to-network (V2N), and vehicle-to-pedestrian (V2P).

The transmission path for data from a user equipment to something else is commonly referred to as the uplink. To transmit data, a user equipment may first transmit a request that it be granted bandwidth (in terms of time and frequency resources) with which to transmit the data. In response to the resource request, the user equipment may receive a resource grant, identifying resources that have been allocated to the user equipment for use in transmitting the data. Uplink resource allocation thus occurs when a user equipment has messages (also referred to as data packets) to be transmitted.

Goals in uplink data scheduling in V2X systems include minimizing data packet delay and maximizing throughput. A challenge that the present disclosure addresses is timely sending as much data as possible within constraints imposed by grant size, delay tolerance (budget), and packet format.

BRIEF SUMMARY

Various implementations of systems, methods and devices within the scope of the appended claims each have several aspects, no single one of which is solely, responsible for the desirable attributes described in this disclosure. Without limiting scope of the appended claims, some prominent features are described.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method for uplink communication by a wireless communication system user equipment. An exemplary method may include providing a plurality of data packets by a data source in the user equipment, detecting a pattern relating to uplink transmission of the plurality of data packets, and scheduling transmission of the plurality of data packets based on a detected pattern.

Another aspect of the disclosure provides a system for uplink communication by a wireless communication system user equipment. An exemplary system may include a data-layer subsystem having a data source configured to provide a plurality of packets for transmission and a transmission-layer subsystem having uplink path circuitry and at least one processing system. The at least one processing system may be configured to detect a pattern relating to uplink transmission of the plurality of data packets and schedule transmission of the plurality of data packets based on a detected pattern.

Another aspect of the disclosure provides a device for uplink communication by a wireless communication system user equipment. An exemplary device may include means for providing a plurality of data packets by a data source in the user equipment, means for detecting a pattern relating to uplink transmission of the plurality of data packets, and means for scheduling transmission of the plurality of data packets based on a detected pattern.

Another aspect of the disclosure provides a non-transitory computer-readable medium. An exemplary non-transitory computer-readable medium stores computer-executable code that, when executed by a processor, controls the processor to provide a plurality of data packets by a data source in the user equipment, detect a pattern relating to uplink transmission of the plurality of data packets, and schedule transmission of the plurality of data packets based on a detected pattern.

BRIEF DESCRIPTION OF THE DRAWINGS

In the figures, like reference numerals refer to like parts throughout the various views unless otherwise indicated. For reference numerals with letter character designations such as "102*a*" or "102*b*", the letter character designations may differentiate two like parts or elements present in the same figure. Letter character designations for reference numerals may be omitted when it is intended that a reference numeral encompass all parts having the same reference numeral in all figures.

DETAILED DESCRIPTION

Figure 1:
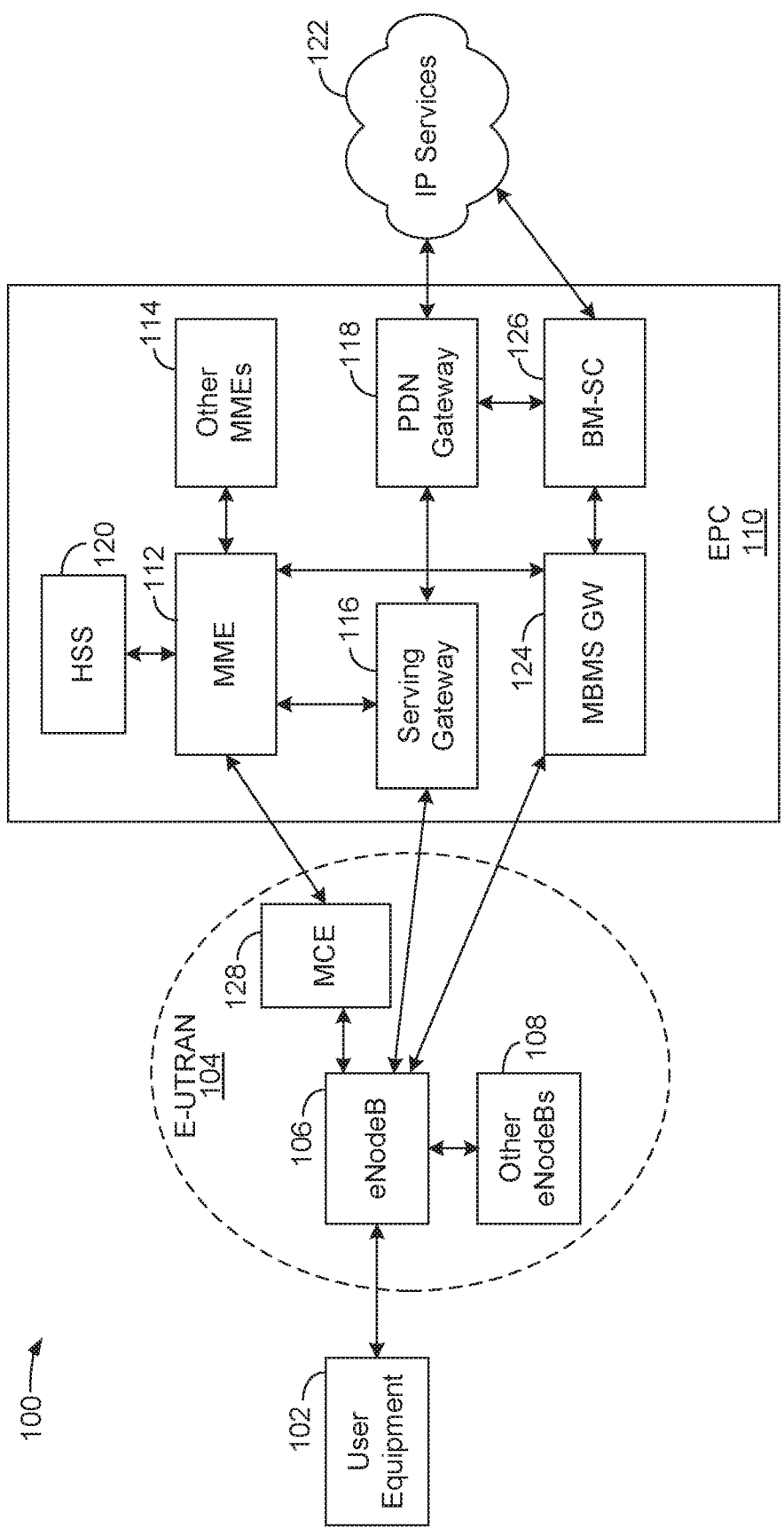
FIG. 1 is a diagram illustrating an example of a network architecture, in accordance with various aspects of the present disclosure.

The word "exemplary" is used in this disclosure to mean "serving as an example, instance, or illustration." Any aspect described in this disclosure as "exemplary" is not necessarily to be construed as preferred or advantageous over other aspects.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any, combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may, be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Exemplary embodiments of the disclosure are, directed to device-to-device (D2D) and, more particularly, vehicle-to-vehicle (V2V) and vehicle-to-everything (V2X) communication in which certain embodiments enable and provide communication techniques that may include a UE scheduling transmission of data packets based on patterns that the UE may detect relating to such uplink (UL) transmissions. Such a pattern may include, for example, a pattern of one or more of: data packet sizes; data packet priorities; mismatches between periodic data packet sizes and corresponding resource grant sizes; data packet destination addresses; and output buffer contents. The scheduling may include the UE transmitting resource requests, receiving resource grants in response to the resource requests, assigning granted resources to the data packets, and transmitting the data packets using the assigned resources. One or more of these aspects of scheduling UL transmissions may be based on a detected pattern.

As used in this disclosure, the term "NR" refers to "new radio" which is a way of referring to a radio interface that may be part of the 5G communication methodology. The term "NR" can be used interchangeably with the term "5G."

Certain radio resources can be used for direct vehicle to vehicle (V2V) or vehicle-to-everything (V2X) communication. These resources are generally referred to as "sidelink" resources and may be used to communicate over a "sidelink channel." A sidelink channel is a communication channel that does not use a base station to relay communication between and among UEs.

Two broad categories of UL transmission scheduling are: (1) event-driven, and (2) semi-persistent scheduling (SPS). In event-driven UL transmission scheduling, a UE transmits a resource request indicating a requested amount of bandwidth and waits for a reply referred to as a "resource grant." A resource grant identifies resources (in terms of time and bandwidth elements) that have been allocated to the UE to use to transmit data. The UL data may be transmitted in a unit known as a "transport block" (TB) using the granted resource elements. A UE may leverage SPS resource allocation instead of event-driven resource allocation in use cases in which the data to be transmitted is periodic. Thus, in SPS UL transmission scheduling, an SPS resource request also indicates an SPS period (i.e., a periodic time interval). An SPS resource grant in reply to an SPS resource request is provided at intervals of the SPS period. The SPS resource grant thus identifies resources that have been allocated for use in transmitting data during the SPS period associated with the SPS resource grant. In a case in which multiple packets are to be transmitted each SPS period, a corresponding number of resource grants may be provided each SPS period without the UE sending another SP resource request. The UE may continue to use SPS resource grants in synchronism with the SPS period without the UE being required to provide another SPS resource request.

FIG. 1 is a diagram illustrating an LTE network architecture or Evolved Packet System (EPS) 100. The EPS 100 may include one or more UEs 102, an Evolved UMTS Terrestrial Radio Access Network (E-UTRAN) 104, an Evolved Packet Core (EPC) 110, and an Operator's Internet Protocol (IP) Services 122. The EPS 100 can interconnect with other access networks, but for simplicity those entities/interfaces are not shown. As shown, the EPS 100 provides packet-switched services; however, as those skilled in the art will readily appreciate, the various concepts presented throughout this disclosure may be extended to networks providing circuit-switched services.

The E-UTRAN 104 includes a base station, such as, for example the evolved Node B (eNB) 106 and other eNBs 108, which may include a gNodeB (gNB) a Home NodeB, a Home eNodeB, or a base station using some other suitable terminology. For example, in a 5G or New Radio (NR) network, a base station may be referred to as a gNB. The E-UTRAN 104 may also include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration. (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system device, a multimedia device, a video device, a digital audio player (e.g., MP3 player), a camera, a game console, a tablet, a smart device, a wearable device, a vehicle, a drone, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, drone, vehicle, industrial equipment, medical equipment, wearable, entertainment device, recreational device, mammal implantable device, or some other suitable terminology.

The eNB 106 is connected to the EPC 110. The EPC 110 may include a Mobility Management Entity (MME) 112, other MMEs 114, a Serving Gateway 116, a Packet Data Network (PDN) Gateway 118, a Home Subscriber Server (HSS) 120, a Multimedia Broadcast Multicast Service (MBMS) Gateway 124, and a Broadcast Multicast Service Center (BM-SC) 126. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia. Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
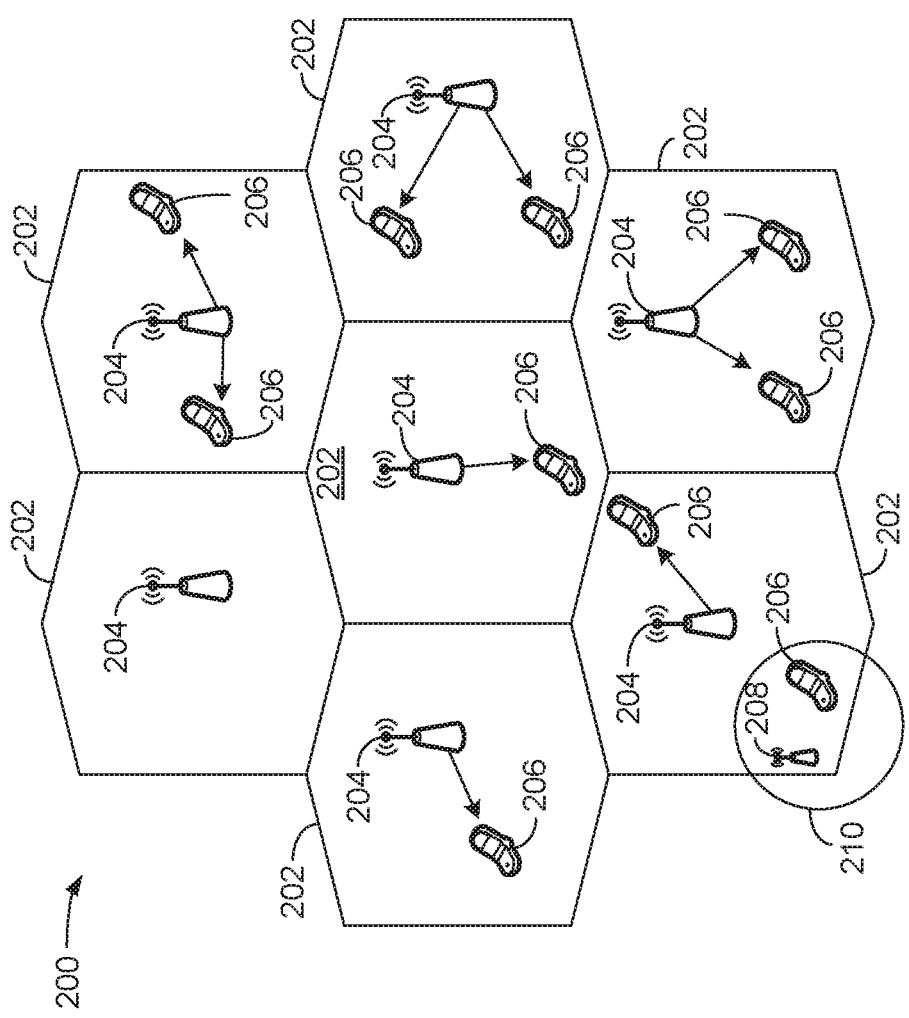
FIG. 2 is a diagram illustrating an example of an access network, in accordance with various aspects of the present disclosure.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pica cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "gNB," "base station," and "cell" may be used interchangeably in this disclosure.

The modulation and multiple access scheme employed by the access network 200 may vary depending on the particular telecommunications standard being deployed. In LTE applications, OFDM is used on the DL, and SC-FDMA is used on the UL to support both frequency division duplex (FDD) and time division duplex (TDD). As those skilled in the art will readily appreciate from the detailed description to follow, the various concepts presented in this disclosure are well suited for LTE applications. However, these concepts may be readily extended to other telecommunication standards employing other modulation and multiple access techniques. By way of example, these concepts may be extended to Evolution-Data Optimized (EV-DO), Ultra. Mobile Broadband (UMB), 5G, or other modulation and multiple access techniques. EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially, precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting SC-FDMA on the UL and OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. SC-FDM A may be provided in the form of a DF r-spread OFDM signal to compensate for high peak-to-average power ratio (PAIR).

Figure 3:
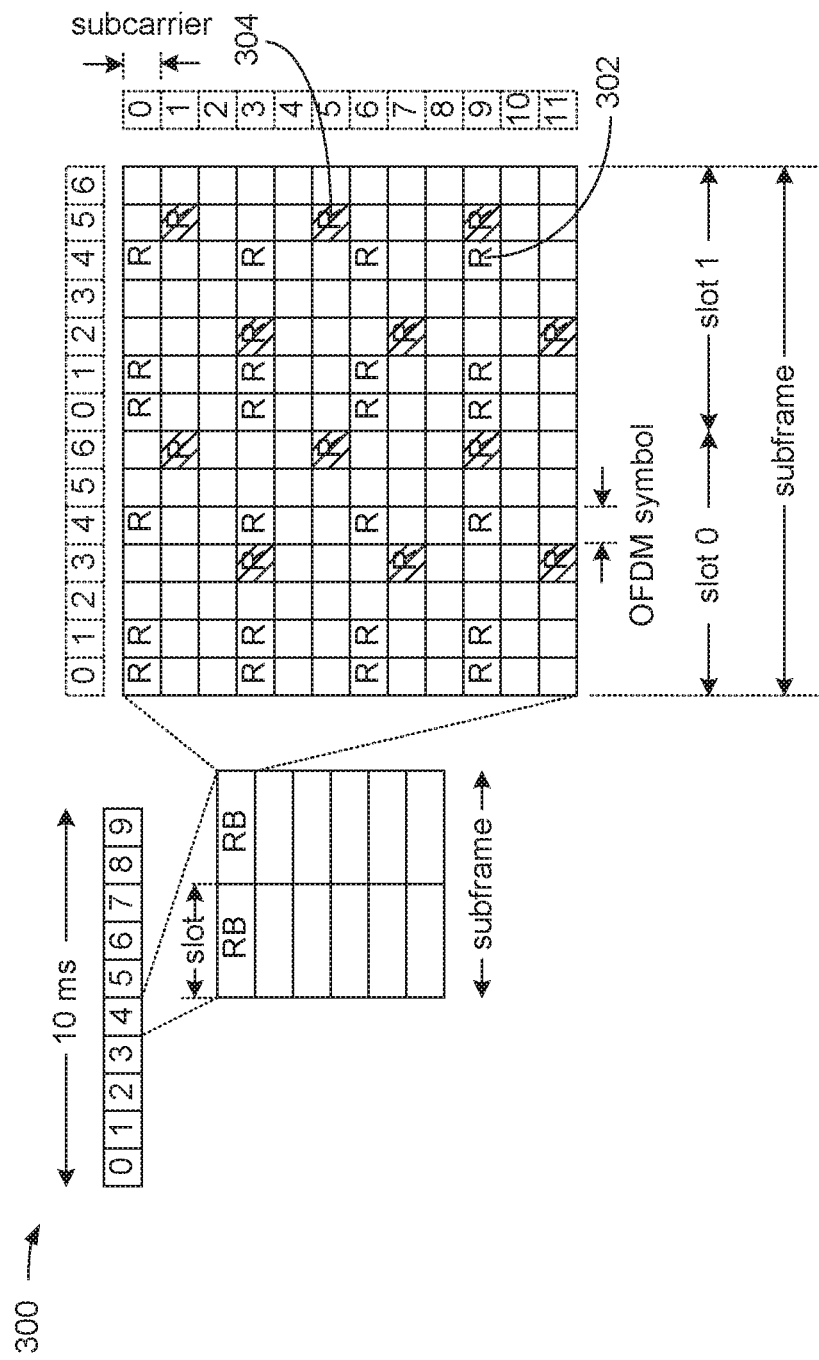
FIG. 3 is a diagram illustrating an example of a downlink frame structure in LTE, in accordance with various aspects of the present disclosure.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. In other exemplary communication systems, such as, fir example, a 5G or a NR communication system, other numbers of subcarriers in the frequency domain and symbols in the time domain, providing other numbers of resource elements are possible. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
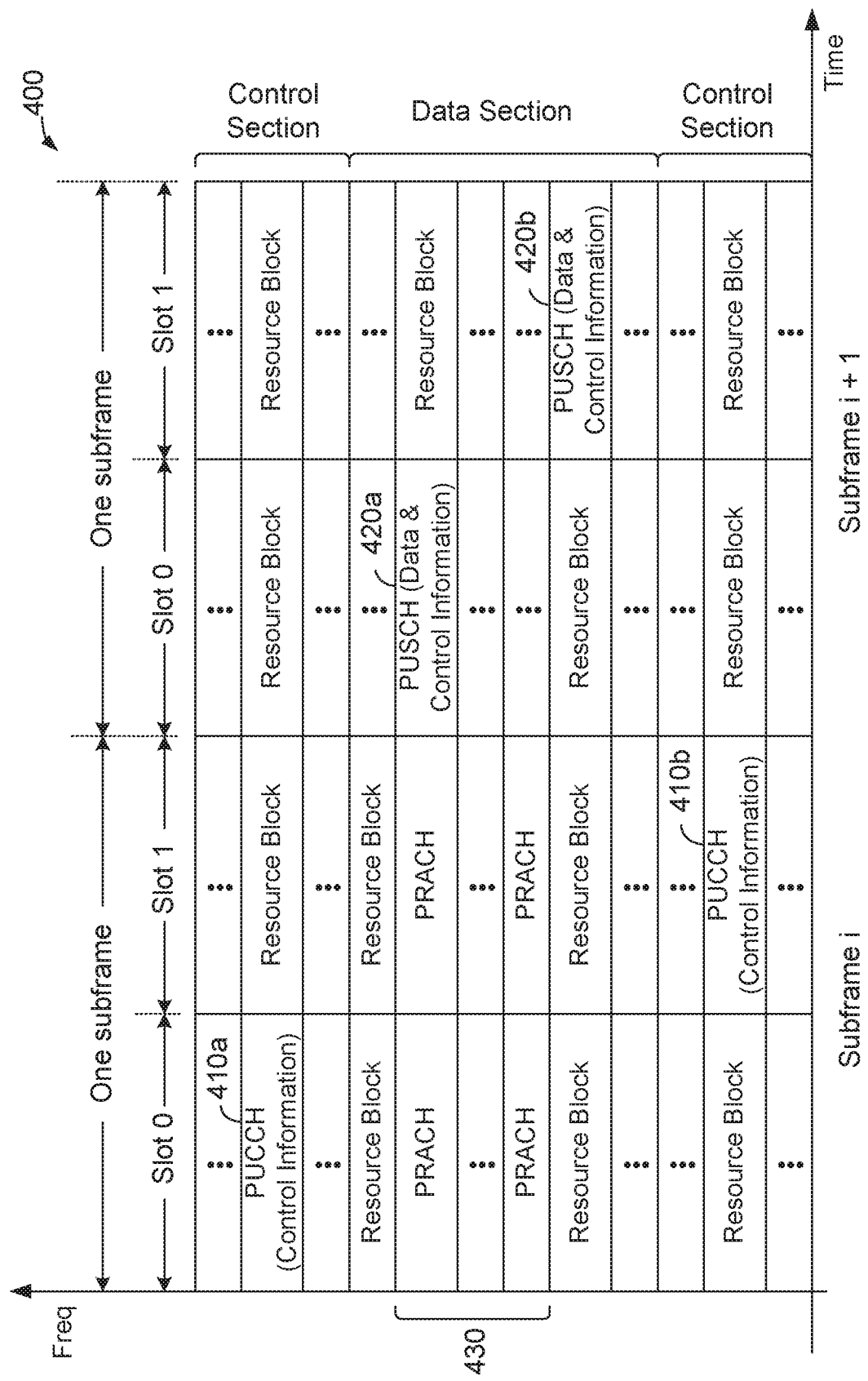
FIG. 4 is a diagram illustrating an example of an uplink frame structure in LTE, in accordance with various aspects of the present disclosure.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/ signaling. Each random access preamble occupies a bandwidth corresponding to six consecutive resource blocks. The starting frequency is specified by the network. That is, the transmission of the random access preamble is restricted to certain time and frequency resources. There is no frequency hopping for the MACH. The PRACH attempt is carried in a single subframe (1 ms) or in a sequence of few contiguous subframes, and a UE can make a single PRACH attempt per frame (10 ms).

Figure 5:
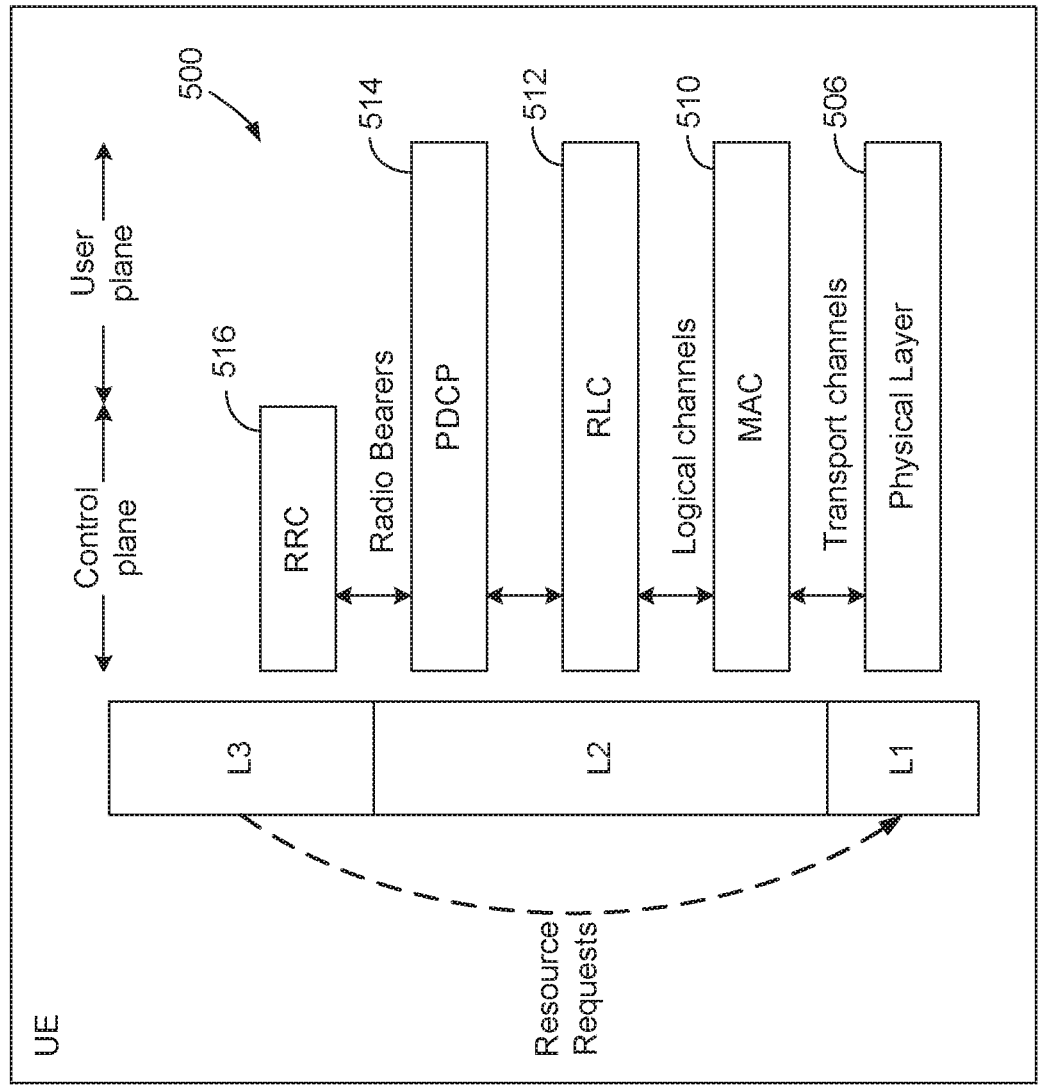
FIG. 5 is a diagram illustrating an example of a radio protocol architecture for the user and control planes in a user equipment, in accordance with various aspects of the present disclosure.

FIG. 5 illustrates an example of a radio protocol architecture 500 in a UE for the user and control planes in LTE in accordance with various aspects of the present disclosure. The radio protocol architecture for the UE is shown with three layers: an L1 layer (also referred to as "Layer 1"), an L2 layer (also referred to as "Layer 2"), and an L3 layer (also referred to as "Layer 3"). The L1 layer is the lowest layer and implements various physical layer signal processing functions. The L1 layer will be referred to in this disclosure as the physical layer 506. Physical layer 506 is also responsible for responding to resource requests issued by the L3 layer in a device-to-device (D2D) communication mode. Although for purposes of clarity such resource requests are conceptually indicated by a broken-line arrow from the L1 layer to the L3 layer, one of ordinary skill in the art understands that the signals underlying such a resource request may reach physical layer 506 via the intervening L2 layer. The L2 layer is above the physical layer 506 and is responsible for the link between the UE and an eNB, or between the UE and another UE, over the physical layer 506.

In the user plane, the L2 layer includes a media, access control (MAC) sublayer 510, a radio link control (RLC) sublayer 512, and a packet data convergence protocol (PDCP) 514 sublayer, which are terminated at the eNB on the network side. The L3 layer above the L2 layer may include, for example, a network layer (e.g., IP layer) that is terminated at the PDN gateway 118 on the network side, and an application layer that is terminated at the other end of the connection (e.g., far end 11E, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 may also be involved in allocating radio resources in one cell among multiple UEs. The MAC sublayer 510 is also responsible for HARQ operations.

In the control plane, the radio protocol architecture for the UE and eNB is substantially the same for the physical layer 506 and the L2 layer with the exception that there is no header compression function for the control plane. The control plane also includes a radio resource control (RRC) sublayer 516 in the L3 layer. The RRC sublayer 516 is responsible for obtaining radio resources (e.g., radio bearers) and for configuring the lower layers using RRC signaling between the eNB and the UE.

An application layer or other L3 layer may issue resource requests 502 that indicate data to be transmitted by the UE (i.e., an UL transmission). A resource request 502 may include a payload (i.e., the data to be transmitted) as well as ancillary information or metadata, such as a size of the payload, a delay budget, a priority, or other information. In an autonomous D2D communication mode, in which an eNB is not involved in resource allocation, physical layer 506 may respond to, i.e., act upon, resource requests 502. In such a D2D communication mode, physical layer 506 may respond to a resource request 502 by allocating radio resources (e.g., resource elements). Allocating resources may also be referred to as granting resources, and a resource allocation may also be referred to as a resource grant. The data to be transmitted may be buffered in MAC sublayer 510 until such time as the data is actually transmitted using the resource grant. At the corresponding time, and otherwise in accordance with the resource grant, physical layer 506 may indicate to MAC sublayer 510 to transmit data in the buffer over physical layer 506.

Figure 6:
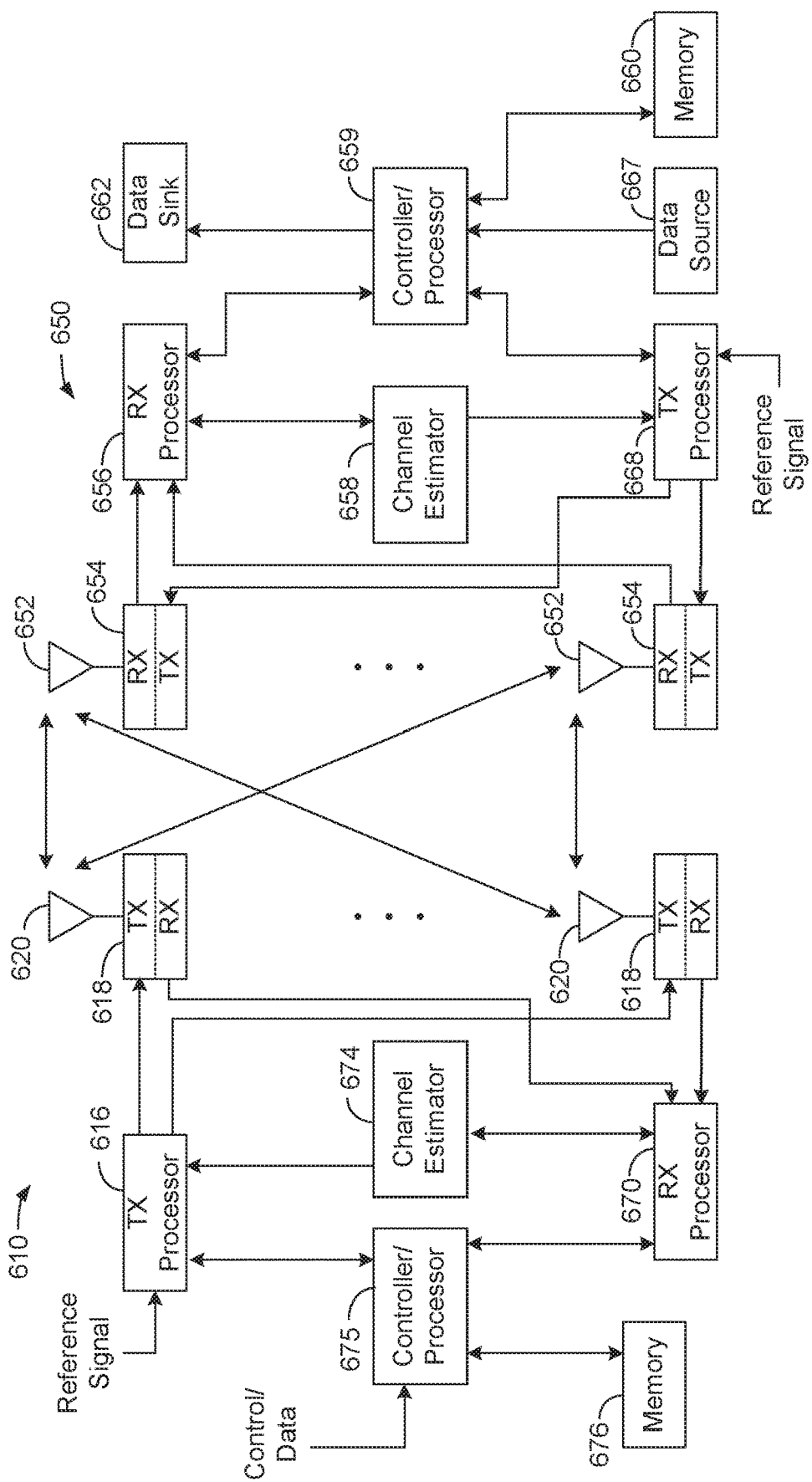
FIG. 6 is a diagram illustrating an example of an evolved Node B and user equipment in an access network, in accordance with various aspects of the present disclosure.

FIG. 6 is a block diagram of an eNB 610 in communication with a UE 650 in an access network in accordance with various aspects of the present disclosure. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by a channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program code and data. The memory 660 may be an example of a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by the channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
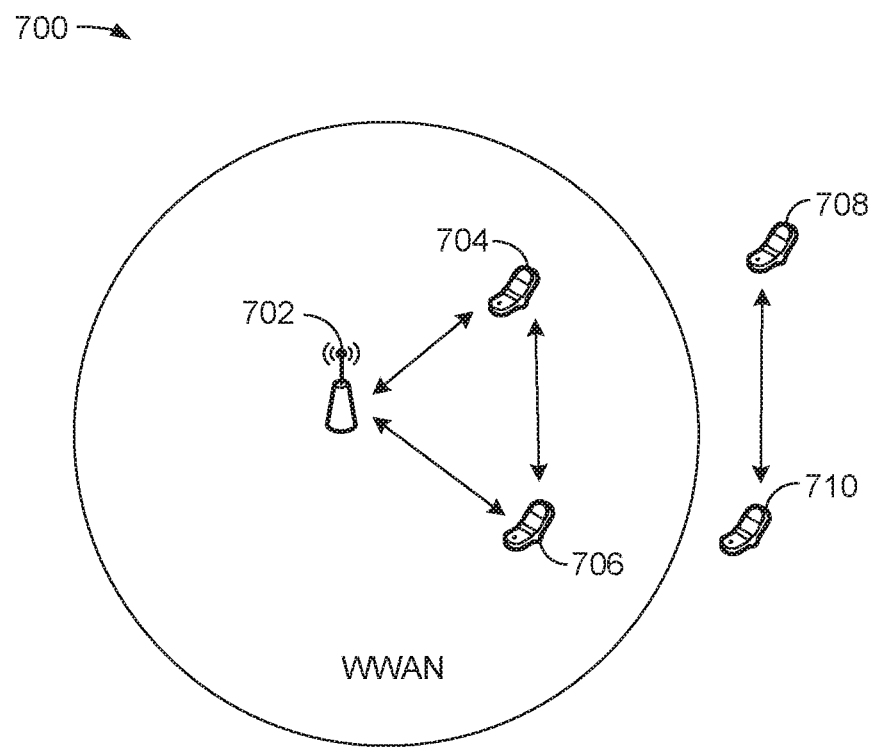
FIG. 7 is a diagram of a device-to-device communications system, in accordance with various aspects of the present disclosure.

FIG. 7 is a diagram of a D2D communications system 700 in accordance with various aspects of the present disclosure. The D2D communications system 700 may be implemented by the network shown in FIG. 1, and, in an exemplary embodiment, includes a plurality of UEs or wireless devices 704, 706, 708, 710. The D2D communications system 700 may overlap with a cellular communications system (as shown and described in FIG. 1 and FIG. 2), such as for example, a wireless wide area network (WWAN). Some of the wireless devices 704, 706, 708, 710 may communicate together in device-to-device (or peer-to-peer) communication using the DL/UL WWAN spectrum, some may communicate with the base station 702, and some may do both. For example, as shown in FIG. 7, the wireless devices 708, 710 are in D2D communication and the wireless devices 704, 706 are in D2D communication. The wireless devices 704, 706 are also in communication with a base station 702.

In an exemplary embodiment, some or all of the UEs 704, 706, 708, 710 may be equipped or located on vehicles. In such an embodiment, the D2D communications system 700 may also be referred to as a vehicle-to-vehicle (V2V) communications system.

The exemplary methods and apparatuses described in this disclosure are applicable to any of a variety of wireless D2D communications systems, such as for example, a wireless D2D communication system based on FlashLinQ, WiMedia, Bluetooth, ZigBee, or Wi-Fi based on the IEEE 802.11 standard, To simplify the discussion, the exemplary methods and apparatus are discussed within the context of LTE. Yet one of ordinary skill in the art would understand that the exemplary methods and apparatuses are applicable more generally to a variety of other wireless device-to-device communication systems or communication networks such as 5G and beyond.

Figure 8:
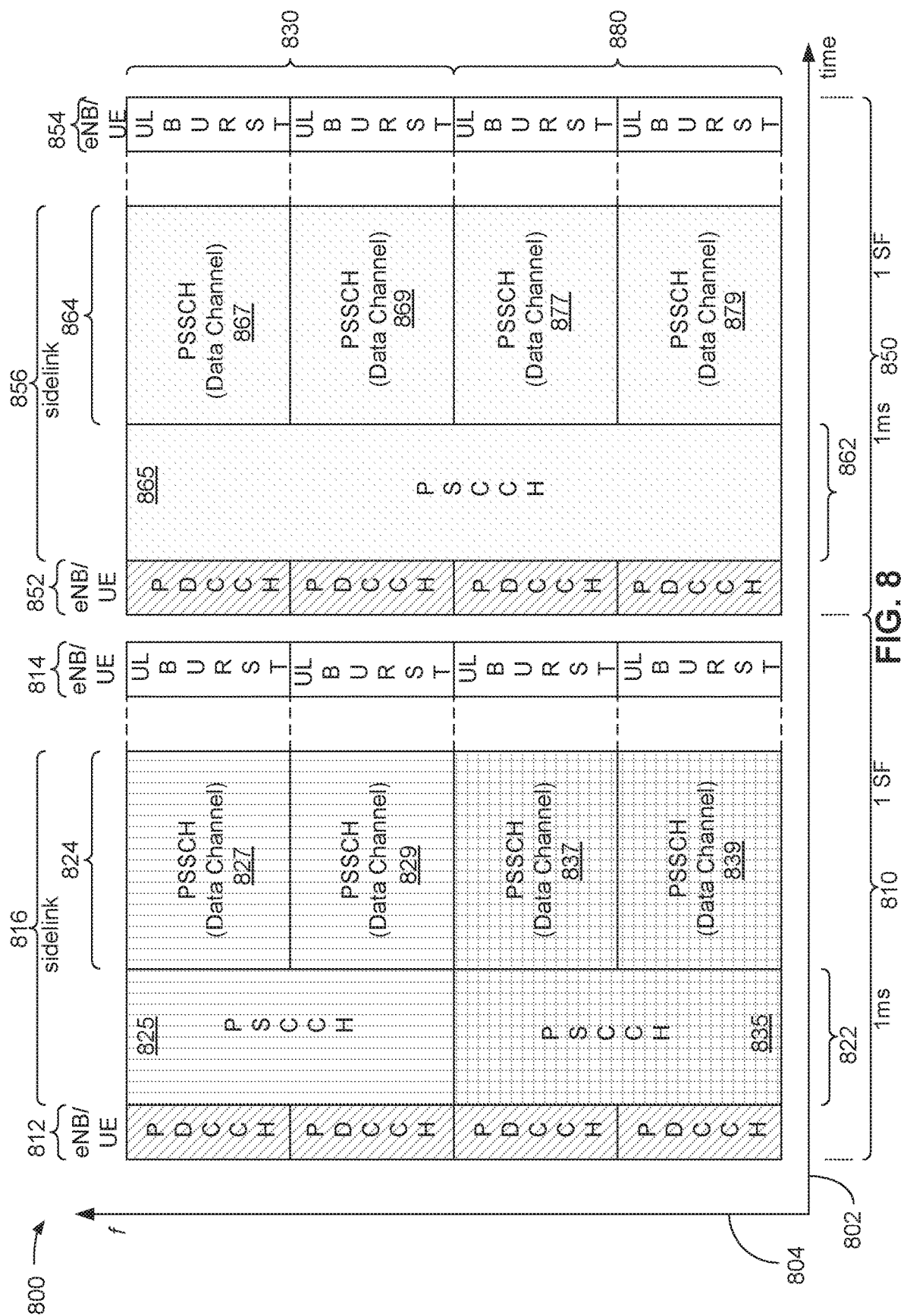
FIG. 8 is a diagram illustrating an example of a frame structure, in accordance with various aspects of the present disclosure.

FIG. 8 illustrates an example of a communication frame structure 800, in accordance with various aspects of the present disclosure. In an exemplary embodiment, the communication frame structure 800 comprises a subframe 810 and a subframe 850. However, it should be understood that two subframes are shown for convenience only. Typically, many more subframes will be part of a communication frame structure.

The subframe 810 and the subframe 850 generally comprise a period of time and a set of frequencies that define a number of different resources, sometimes referred to as resource blocks, or radio resources.

In an exemplary embodiment, the subframe 810 and the subframe 850 may each occur over a time period of 1 millisecond (ms). However, the duration of a subframe is dependent upon a number of different parameters, and may be shorter or longer, depending on implementation. In an exemplary embodiment, the subframe 810 and the subframe 850 may be divided into what can be referred to as "sub channels." For example, certain frequency portions of the subframe 810 and the subframe 850 may comprise a sub-channel 830 and certain frequency portions of the subframe 810 and the subframe 850 may comprise a sub-channel 880. The sub-channels 830 and 880 are shown for illustrative purposes only as occupying one half of the frequency resources of the frame structure 800. The sub-channels 830 and 880 are optional, and, if present, may occupy more of less of the frequency resources shown. Further, more than two sub-channels may occupy the frequency resources shown.

In an exemplary embodiment, the subframe 810 may comprise a number of different communication channels that occupy a number of resources, both in time and in frequency. Time is shown on the horizontal axis 802 increasing to the right and frequency is shown on the vertical axis 804 increasing upward.

In an exemplary embodiment, the subframe 810 may comprise a 5G physical downlink control channel (PDCCH) 812 and an uplink channel 814. In an exemplary embodiment, the PDCCH 812 and the uplink channel 814 are used for communication between a UE and a base station (eNB).

In an exemplary embodiment, the subframe 810 may also comprise a number of radio resources that can be used for V2V or other D2D communication. These resources are generally referred to as "sidelink" resources and may be used to communicate over a "sidelink channel," and are generally referred to using the reference numeral 816. The sidelink channel 816 may comprise a number of radio resources including, for example, a physical sidelink control channel (PSCCH) 822, and a physical sidelink shared channel (PSSCH) 824. The PSCCH 822 is a control channel over which control information is communicated and the PSSCH 824 is a data channel over which data is communicated.

Similarly, in an exemplary embodiment, the subframe 850 may comprise a 5G physical downlink control channel (PDCCH) 852 and an uplink channel 854. In an exemplary embodiment, the PDCCH 852 and the uplink channel 854 are used for communication between a UE and a base station (eNB).

In an exemplary embodiment, the subframe 850 may also comprise a number of sidelink radio resources that can be used for direct V2V or other D2D communication. These "sidelink" resources are generally referred to using the reference numeral 856. The sidelink channel 856 may comprise a number of radio resources including, for example, a physical sidelink control channel (PSCCH) 862, and a physical sidelink shared channel (PSSCH) 864. The PSCCH 862 is a control channel over which control information is communicated and the PSSCH 864 is a data channel over which data is communicated.

Figure 9:
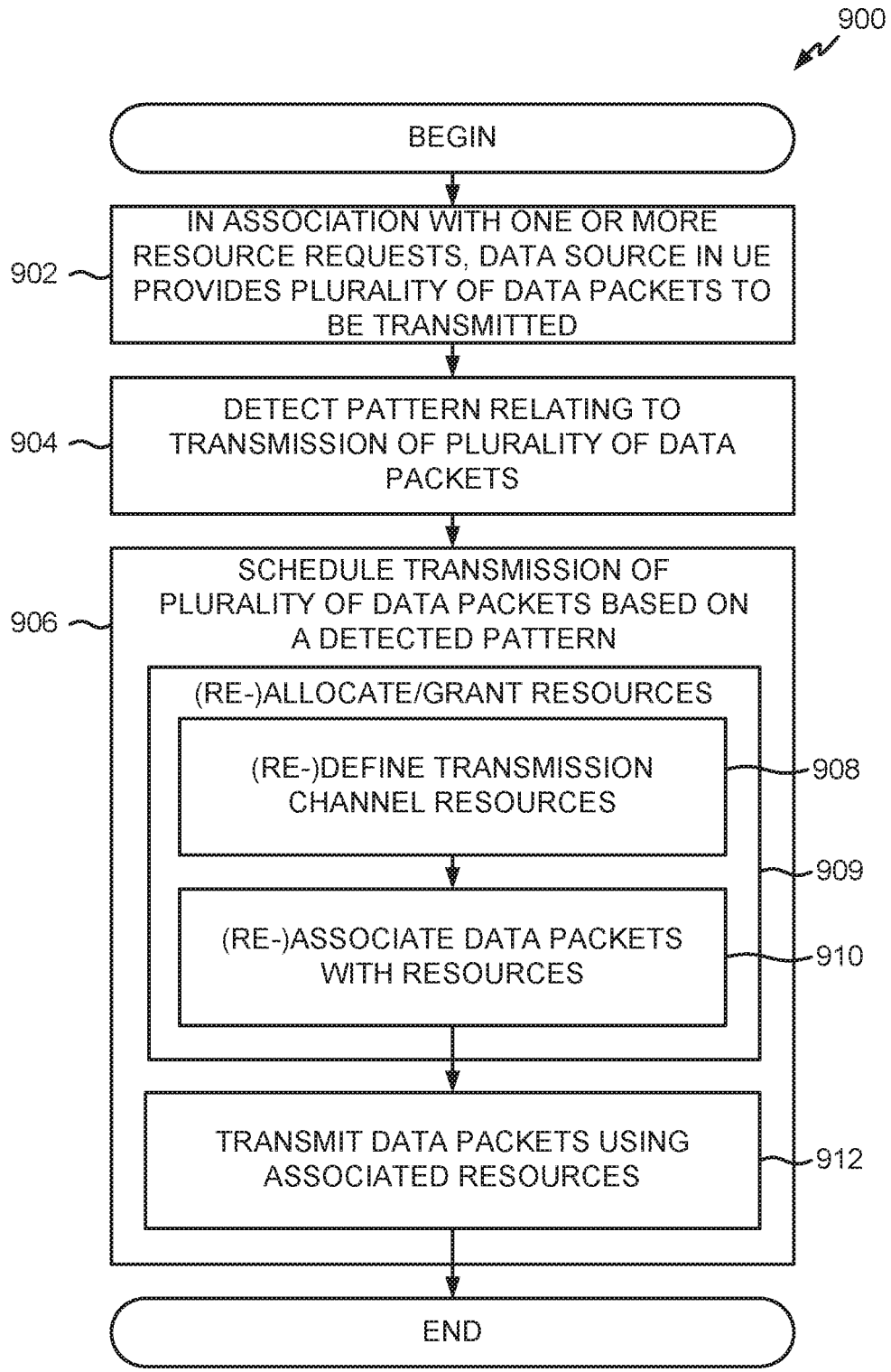
FIG. 9 is a flow diagram illustrating an example of a method for uplink communication, including transmission scheduling aspects, in accordance with various aspects of the present disclosure.

FIG. 9 is a flow diagram illustrating an exemplary method 900 for a UE to communicate UL data directly with another UE via a sidelink channel, i.e., in a V2V or other D2D communication mode. In the exemplary method 900, the V2V or other D2D communication mode may be autonomous, meaning that an eNB is not involved. A UE participating in method 900 may be any of the UEs described above with regard to FIGS. 1, 2, 6, and 7. Method 900 may be controlled by one or more processors in the UE. Controller/processor 659 (FIG. 6) may be an example of such one or more processors that may control method 900. Program code under which controller/processor 659 operates to control method 900 may be stored in, for example, memory 660 (FIG. 6). Such program code may be associated with (FIG. 5) physical layer 506, MAC sublayer 510, or both. For brevity, the following descriptions of methods may refer to certain operations or actions performed under the control of such one or more processors as being performed by the UE or a subsystem thereof.

As indicated by block 902, method 900 includes a data source in the UE providing a plurality of data packets to be transmitted (i.e., UL transmission). The data source provides the data packets in association with one or more resource requests. For example, in an event-driven case, the data source may provide a data packet together with a resource request. In an SPS case, the data source may provide the data packets at a periodic interval subsequent to a single resource request that identifies the period. Data source 667 (FIG. 6) may be an example of such a UE data source that provides data packets to be transmitted and associated resource requests. Although the data source may provide the data packets successively, such a sequence or order may or may not be of significance in method 900. Examples of method 900 described below note any such sequence or order where significant.

The data source may be in the application sublayer or other portion of the L3 layer (or still higher layer) described above with regard to FIG. 5. Accordingly, each data packet to be transmitted may be associated with of one of the resource requests described above with regard to FIG. 5. The data packets may be buffered (e.g., in the above-described MAC sublayer 510) until they are transmitted. For example, a portion of memory 660 (FIG. 6) may serve as such an output buffer.

As indicated by block 904, method 900 may further include the UE detecting a pattern relating to transmission of the plurality of data packets. As described below, such a pattern may include, for example, a pattern of one or more of: data packet sizes; data packet priorities; mis-matches between periodic e.g., SPS data packet sizes and corresponding resource grant sizes; data packet destination addresses; and output buffer contents. The entity responsible for allocating resources may also be responsible for detecting a pattern. For example, such a resource-allocating entity may be in the physical layer 506, as described above with regard to FIG. 5.

As indicated by block 906, method 900 may include scheduling transmission of the plurality of data packets based on a detected pattern relating to UL transmission of the plurality of data packets. Such transmission scheduling may include defining (including re-defining, if previously defined) transmission channel resources, as indicated by block 908. The resource-allocating entity may also be responsible for transmission scheduling.

As the term is used in this disclosure, "defining" transmission channel resources may include selecting one or more resource elements or other transmission channel resources to use in transmitting the associated data packet or packets. The number of resource elements selected may depend upon the amount or size of the data to be transmitted. As understood by one of ordinary skill in the art, in an autonomous D2D mode a resource-allocating entity of the UE may maintain a pre-configured resource pool of resource elements or other transmission channel resources. Resource elements in the resource pool that are unallocated at the time of the resource request are available for allocation in response to the resource request. Conventionally, a resource-allocating entity may allocate resources in response to a resource request by essentially randomly selecting resource elements from among available resource elements in the resource pool. Nevertheless, the resource allocating entity may employ rules to minimize the likelihood of transmission collisions, etc.

Allocating resources includes not only selecting resource elements but also associating the selected resource elements with data packets to be transmitted, as indicated by block 910. The resulting resource grant or allocation thus identifies the selected resource elements and their association with data packets to be transmitted. As may become apparent from examples described below, resource grants may be, but are not necessarily in every instance, sufficient to transmit all buffered data packets within all constraints that may be imposed by packet size, delay budget, priority, etc. As the term is used in this disclosure, the "transmission scheduling"

includes associating (including re-associating, if previously associated) UL transmission channel resources with one or more of the plurality of data packets. Thus, blocks 908 and 910 together relate generally to what is commonly referred to as resource allocation, as indicated by block 909.

The transmission scheduling may also include transmitting the plurality of data packets using the allocated resources (e.g., resource elements), as indicated by block 912. Any one or more of the aspects of transmission scheduling relating to defining transmission resources (block 908), associating data packets with granted resources (block 910), and transmitting the data packets using the associated resources (block 912) may be based on a pattern detected by the UE. Stated another way, in accordance with various aspects of the present disclosure, resource allocation, packet transmission, or both may be based upon a detected pattern relating to transmission of the plurality of data packets.

Figure 10:
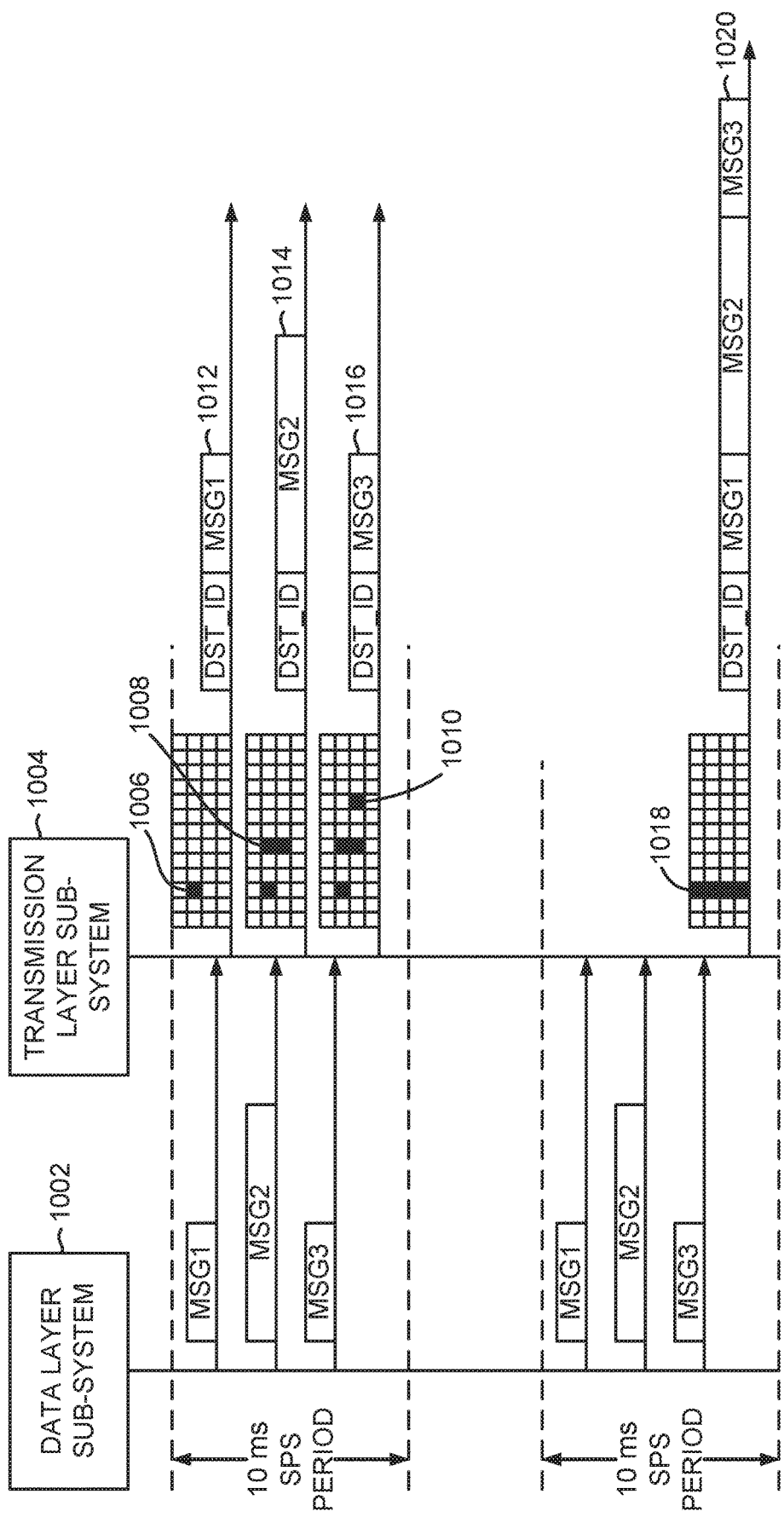
FIG. 10 is a call flow diagram illustrating an example of packet batching in uplink communication, in accordance with various aspects of the present disclosure.

FIG. 10 illustrates an example of a technique that may be referred to as "packet hatching." In the example illustrated in FIG. 10, the data packets to be transmitted by the UE are periodic. That is, the data source provides the data packets at regular time intervals corresponding to a period. The UE may schedule the data packets to be transmitted in accordance with SPS techniques, as understood by one of ordinary skill in the art.

A data-layer subsystem 1002 in the UE provides the data packets to be transmitted. Data-layer subsystem 1002 may include a data source such as described above with regard to FIG. 9. Thus, data-layer subsystem 1002 may correspond to the application sublayer or other portion of the L3 layer described above with regard to FIG. 5. Accordingly, data-layer subsystem 1002 may issue resource requests that include the data packets to be transmitted. A transmission-layer subsystem 1004 may correspond to the physical layer 506 (FIG. 5). For example, transmission-layer subsystem 1004 may include the UL path elements of above-described UE 650 (FIG. 6), such as one or more processors, transmitters, antennas, etc., including the one or more processors that control the methods described in this disclosure. In the examples that follow, each data packet may be characterized by, among other things, a size, a priority, and a delay budget or tolerance. Transmission-layer subsystem 1004 may allocate or grant resources in response to the resource requests it receives from data-layer subsystem 1002.

In the example illustrated in FIG. 10, data-layer subsystem 1002 provides three messages or data packets, MSG1, MSG2, and MSG3 within each of one or more SPS periods (e.g., 10 ms). As the data flow is SPS, data-layer subsystem 1002 may issue only a single resource request for the data flow. The resource request may indicate the period.

The data packets MSG1, MSG2, and MSG3 may be stored concurrently with each other in an output buffer, awaiting transmission. Transmission-layer subsystem 1004 may initially schedule transmission of MSG1 using a resource element 1006 (shown in FIG. 10 as included within a generalized or conceptualized depiction of a resource grid of such resource elements). For example, MSG1 may have a size of 5 bytes, and transmission-layer subsystem 1004 accordingly may provide a resource grant of 5 bytes. The resource grant responsive to the resource request and associated with MSG1 may identify resource element 1006 in this example that is sufficient to transmit MSG1. Transmission-layer subsystem 1004 may initially schedule transmission of MSG2 using a group of two resource elements 1008. For example, MSG2 in this example may have a size of 10 bytes, and transmission-layer subsystem 1004 accordingly may provide a resource grant of 10 bytes. The resource grant responsive to the resource request and associated with MSG2 may identify a group of two resource elements 1008 in this example that are collectively sufficient to transmit MSG2. Transmission-layer subsystem 1004 may initially schedule transmission of MSG3 using a resource element 1010. For example, MSG3 may have a size of 5 bytes, and transmission-layer subsystem 1004 accordingly may provide a resource grant of 5 bytes. The resource grant responsive to the resource request and associated with MSG3 may identify resource element 1010 in this example that is sufficient to transmit MSG-3.

Absent packet batching, transmission-layer subsystem 1004 would schedule a first transport block (TB) 1012 for MSG1, a second TB 1014 for MSG2, and a third TB 1016 for MSG3. Transmission-layer subsystem 1004 may schedule such a first TB 1012, second TB 1014, and third TB 1016 in each of one or more successive SPS periods before initiating the packet batching method in response to detecting a pattern.

In accordance with the exemplary packet batching method, transmission-layer subsystem 1004 may detect a pattern, such as in the example illustrated in FIG. 10, of multiple data packets or messages within a single SPS period that are small in size relative to a threshold size. For example, transmission-layer subsystem 1004 may detect or determine that in each period of a particular SPS data flow there have been multiple data packets each less than or equal to 10 bytes. In response to this determination, transmission-layer subsystem 1004 may reschedule the SPS (data flow) transmissions by providing a larger grant size. In the example illustrated in FIG. 10, in which MSG1, MSG2, and MSG3 collectively have a size of 20 bytes, transmission-layer subsystem 1004 accordingly may provide a combined resource grant of 20 bytes. The resource grant may identify a group of four resource elements 1018 in this example that are collectively sufficient to transmit MSG1, MSG2, and MSG3 together in a single transport block 1020. Note that packet batching is possible in this example because data packets of an SPS data flow share the same destination address (DST_ID). Also, in this example each of MSG1, MSG2, and MSG3 has a delay budget, i.e., delay tolerance, which is less than the amount of time required to reschedule the transmission.

Figure 11:
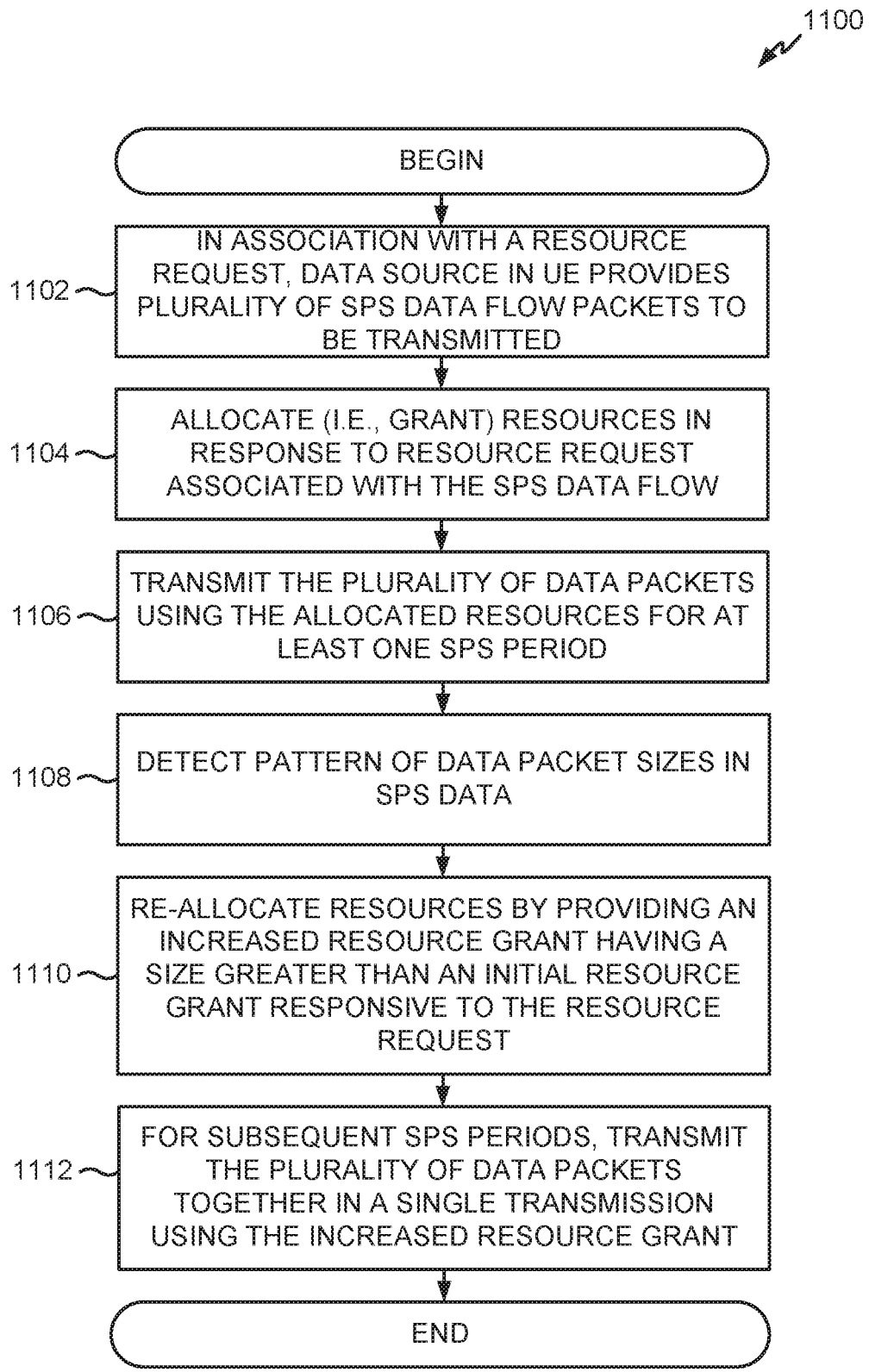
FIG. 11 is a flow diagram illustrating an example of a method for packet batching in uplink communication, in accordance with various aspects of the present disclosure.

FIG. 11 illustrates an exemplary packet batching method 1100 for SPS data flows. Method 1100 may be an example of method 900 (FIG. 9). As indicated by block 1102, a data source in the UE may provide a resource request for a plurality of SPS data packets to be transmitted. The resource request may indicate the SPS period. In association with the resource request, the data source may provide a plurality of data packets to be transmitted. As the data flow is SPS, the data source may provide the plurality of data packets at intervals of the SPS period. That is, during each of one or more SPS periods, the data source provides a plurality of data packets.

As indicated by block 1104, in response to the resource request and data packets provided by the data source, the resource-allocating entity in the UE may provide one or more initial resource grants. As indicated by block 1106, the UE may transmit the data packets for at least one SPS period using the initial resource grants.

As indicated by block 1108, the UE may subsequently detect a pattern of data packet sizes in the SPS data. As indicated by block 1110, the UE may re-allocate resources by providing an increased resource grant having a larger size than the each of the initial resource grants. The larger size may be sufficient to encompass the plurality of data packets.

That is, the resource grant may have a size or capacity sufficient to transmit the plurality of data packets together in a single transmission. As indicated by block 1112, the UE may transmit the plurality of data packets together in a single transmission using the increased resource grant.

Figure 12:
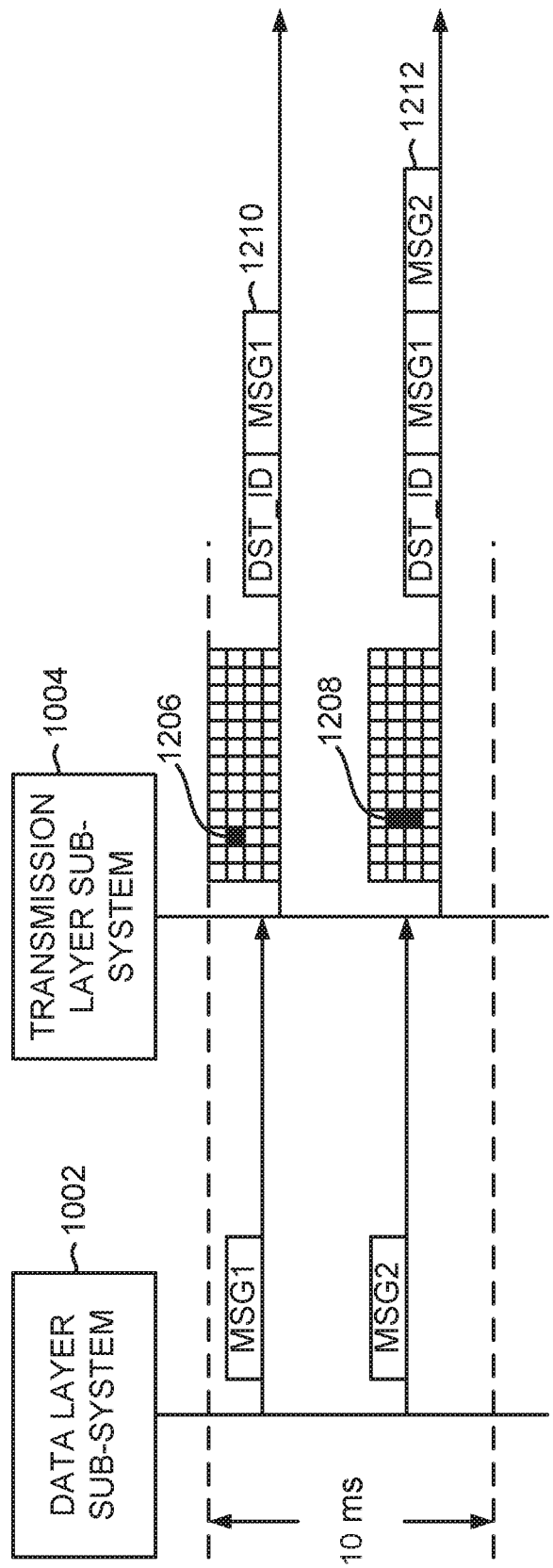
FIG. 12 is a call flow diagram illustrating another example of packet batching in uplink communication, in accordance with various aspects of the present disclosure.

FIG. 12 illustrates another example of a packet batching technique. In the example illustrated in FIG. 12, the data packets to be transmitted by the UE are event-driven. That is, the data source provides each data packet in response to a specific event. In contrast with SPS or periodic data, there is no fixed temporal relationship between event-driven data packets. As the principles by which UE data sources may provide either event-driven data or periodic data under various use cases are well understood by one of ordinary skill in the art, such principles are not described in this disclosure.

In the example illustrated in FIG. 12, data-layer subsystem 1002 provides two messages or data packets, MSG1 and MSG2, which have the same destination address (DST_ID). Data-layer subsystem 1002 provides MSG1 and MSG2 in association with resource requests. In response to the resource request associated with MSG1, transmission-layer subsystem 1004 may initially schedule transmission of MSG1 using a resource element 1206. For example, MSG1 may have a size of 5 bytes, and transmission-layer subsystem 1004 accordingly may provide a resource grant of 5 bytes. The resource grant may identify resource element 1206 in this example that is sufficient to transmit MSG1. In this example, before transmission-layer subsystem 1004 initiates transmission of MSG1, MSG2 (e.g., also 5 bytes) arrives in the output buffer from data-layer subsystem 1002. Thus, data packets MSG1 and MSG2 are momentarily stored concurrently with each other in the output buffer, awaiting transmission. Transmission-layer subsystem 1004 may schedule a first TB 1210 for MSG1, which, absent packet hatching, would be transmitted using the resources corresponding to the above-referenced resource grant. However, in accordance with the packet batching method, transmission-layer subsystem 1004 may detect the pattern in FIG. 10 of multiple data packets or messages being present in the output buffer that are small in size relative to a threshold size and capable of being transmitted before the expiry of the shortest delay, budget among them. In response to this determination, transmission-layer subsystem 1004 may reschedule the transmissions by providing a larger resource grant in place of the original resource grant. Replacing the original resource grant with a larger resource grant effectively cancels the original resource grant.

In the example illustrated in FIG. 12, in which MSG1 and MSG2 together have a size of 10 bytes, transmission-layer subsystem 1004 accordingly may provide a combined or increased resource grant of 10 bytes in place of the original resource grant of 5 bytes. The resource grant may identify a group of two resource elements 1208 in this example that are together sufficient to transmit MSG1 and MSG2 in a single transport block 1212. If TB 1210 has already been generated at the time the rescheduled TB 1212 is generated, transmission-layer subsystem 1004 may cancel the transmission of TB 1210.

Figure 13:
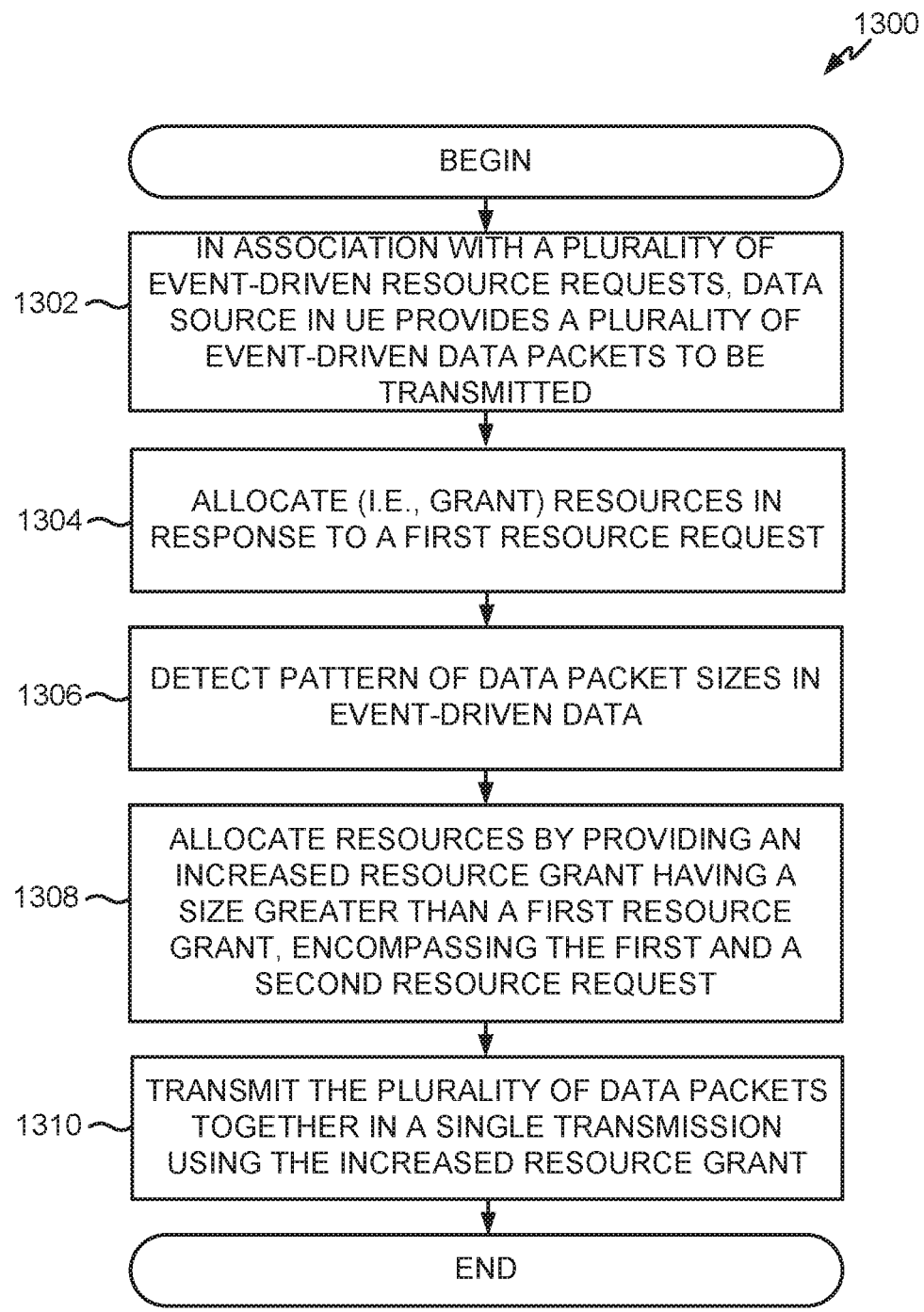
FIG. 13 is a flow diagram illustrating an example of another method for packet batching in uplink communication, in accordance with various aspects of the present disclosure.

FIG. 13 illustrates an exemplary packet batching method 1300 for event-driven data. Method 1300 may be an example of method 900 (FIG. 9). As indicated by block 1302, in association with a plurality of resource requests (e.g., a first resource request, a second resource request, etc.), a data source in the UE may provide a corresponding plurality of event-driven data packets to be transmitted (e.g., a first data packet, a second data packet, etc.).

As indicated by block 1304, in response to the resource request and data packets provided by the data source, the resource-allocating entity in the UE may provide a resource grants (e.g., a first resource grant, a second resource grant, etc.). In this manner, at least a first data packet to which resources have been allocated in accordance with a first resource grant may await transmission (e.g., in a buffer).

As indicated by block 1306, the UE may detect a pattern of data packet sizes in the event-driven data. As indicated by block 1308, the UE may re-allocate resources by providing an increased resource grant having a larger size than the first resource grant. The larger size may be sufficient to encompass the first data packet and one or more of the subsequent (e.g., second, etc.) data packets. That is, the resource grant may have a size or capacity sufficient to transmit the plurality of data packets together in a single transmission. As indicated by block 1310, the UE may transmit the plurality of data packets together in a single transmission using the increased resource grant.

Figure 14:
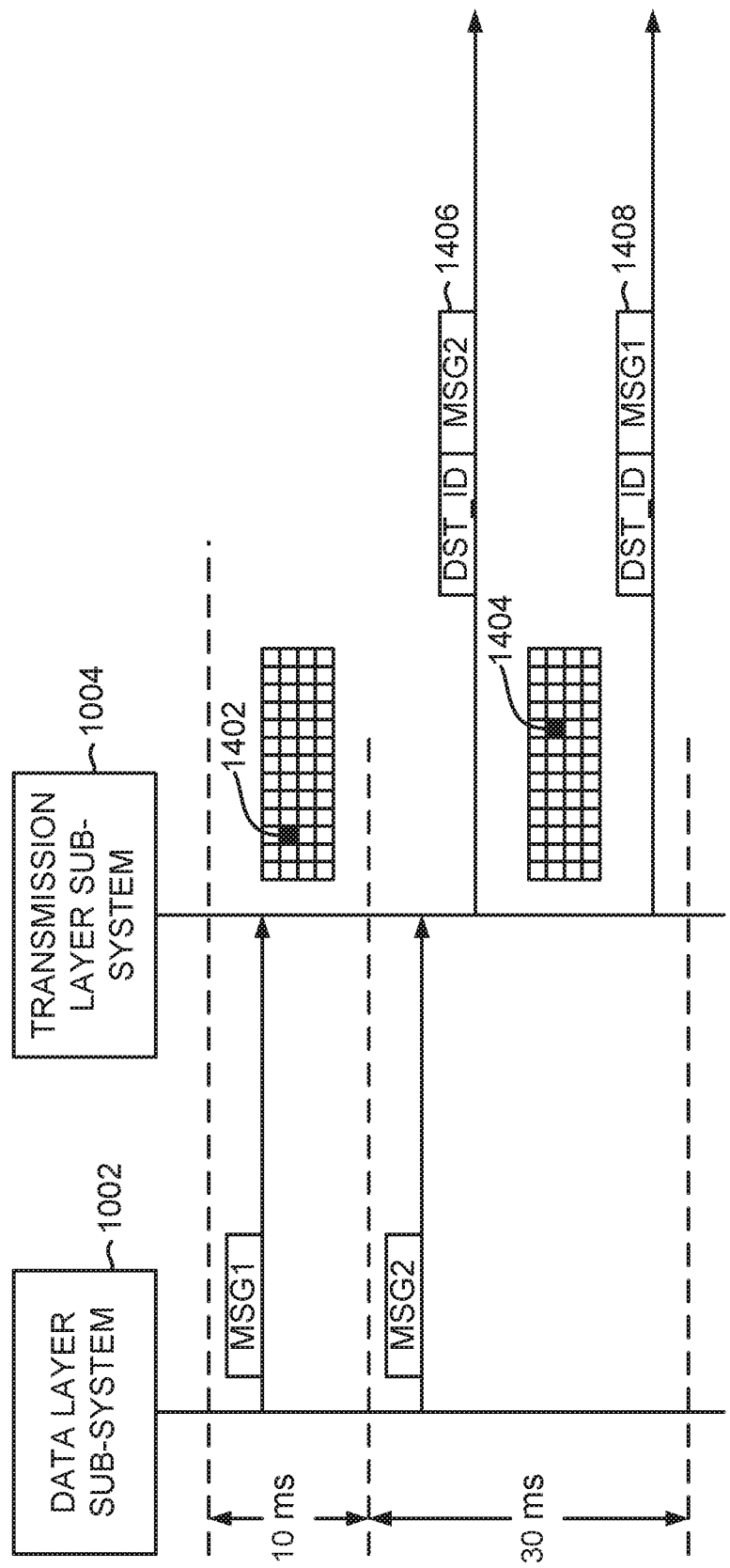
FIG. 14 is a call flow diagram illustrating an example of resource grant swapping in uplink communication, in accordance with various aspects of the present disclosure.

FIG. 14 illustrates an example of a technique that may be referred to as "grant swapping." in the example illustrated in FIG. 14, the data packets to be transmitted by the UE may be event-driven, periodic, or a combination of event-driven and periodic. In this example, in association with a first resource request data-layer subsystem 1002 may provide a first message or data packet MSG1, which may have a size of 5 bytes and a delay budget of 30 ms. MSG1 may have a priority, characterized either by the delay budget or by a separate "priority" parameter. In response to the first resource request, transmission-layer subsystem 1004 may provide a first resource grant of 5 bytes in association with MSG1. The first resource grant may identify resource element 1402 in this example, which is sufficient to transmit 5 bytes. In this example, before transmission-layer subsystem 1004 initiates transmission of MSG1, MSG2 arrives in the output buffer from data-layer subsystem 1002 in association with a second resource request. MSG2 may have a size of 5 bytes and a delay budget of 10 ms. Transmission-layer subsystem 1004 then may request a second resource grant of 5 bytes in association with MSG2. A second resource grant responsive to the second resource request may identify resource element 1404 in this example, which is sufficient to transmit 5 bytes. In this example, the relative priorities of MSG1 and MSG2 may be characterized by their respective delay budgets of 30 ms and 10 ms. MSG2 has a higher priority than MSG1 in this example because MSG2 expires if not transmitted within 10 ins, while MSG1 expires if not transmitted within 30 ms. MSG1 and MSG2 may be momentarily stored concurrently with each other in the output buffer.

In accordance with a grant swapping method, transmission-layer subsystem 1004 may detect a pattern of a lower-priority data packet having arrived in the output buffer before a higher-priority data packet, while a first resource grant sufficient to transmit the higher-priority data packet is received before a second resource grant sufficient to transmit the lower-priority data packet. In response to detecting such a pattern, transmission-layer subsystem 1004 may schedule MSG2 for transmission in a TB 1406 using the resource element 1402 corresponding to the first resource grant, and schedule MSG1 for transmission in a TB 1408 using the resource element 1404 corresponding to the first resource grant, even though the first resource grant was requested in association with MSG1 and the second resource grant was requested in association with MSG2.

Figure 15:
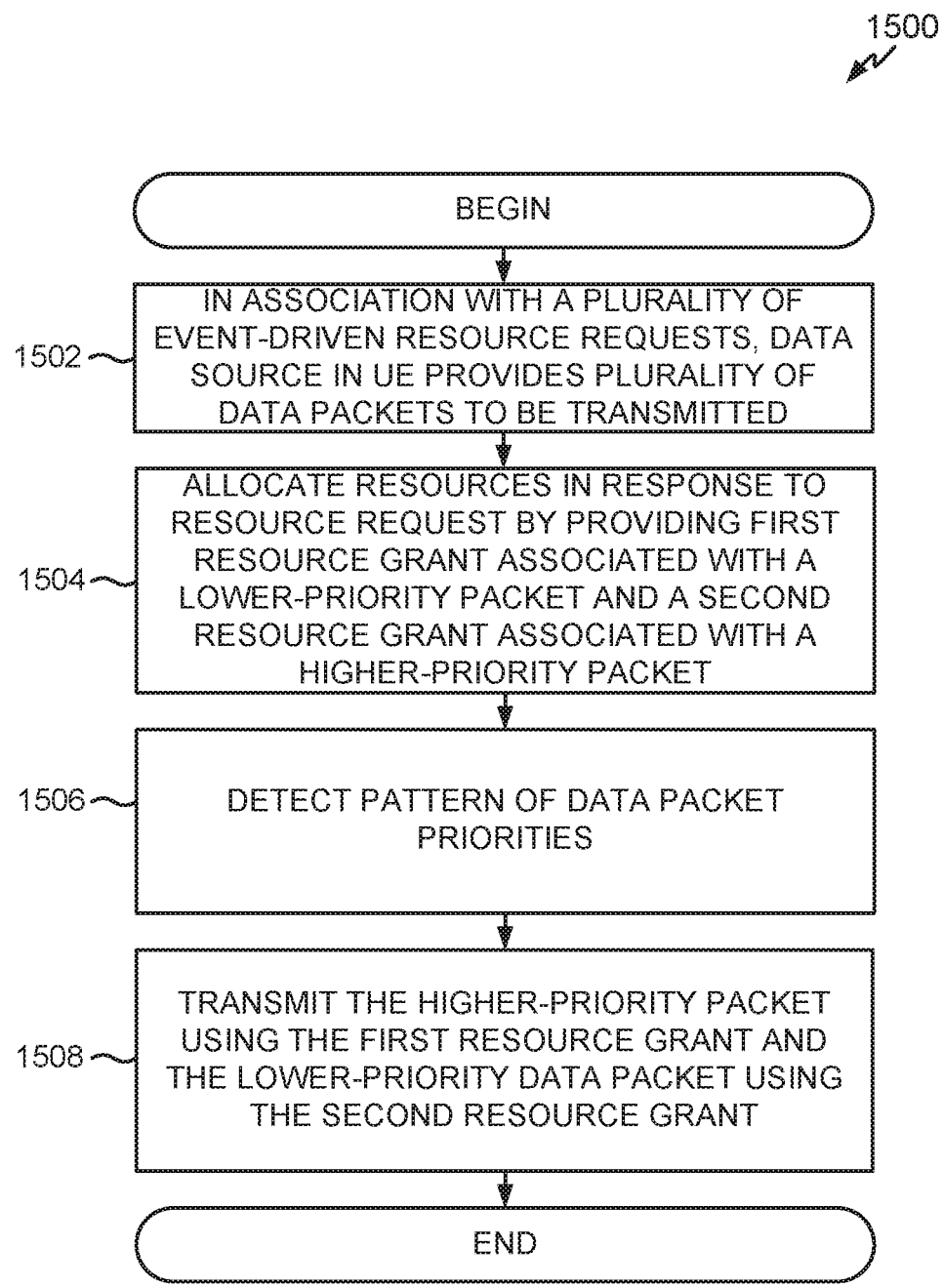
FIG. 15 is a flow diagram illustrating an example of a method for resource grant swapping in uplink communication, in accordance with various aspects of the present disclosure.

FIG. 15 illustrates an exemplary grant swapping method 1500. Method 1500 may be an example of method 900 (FIG.

9). As indicated by block 1502, in association with a plurality of resource requests a data source in the UE may provide a plurality of data packets to be transmitted. A first one of the data packets may have a lower priority, and a second one of the data packets may have a higher priority than the first.

As indicated by block 1504, in response to a first resource request associated with the lower-priority data packet, the resource-allocating entity in the UE may provide a first resource grants. Similarly, in response to a second resource request associated with the higher-priority data packet, the resource-allocating entity in the UE may provide a second resource grant.

As indicated by block 1506, the UE may detect a pattern of data packet priorities. For example, the UE may detect that one data packet has a lower priority than another data packet before it generates corresponding transport blocks. As indicated by block 1508, based at least in part on detecting such a pattern, the UE may transmit the higher-priority data packet using the first resource grant and transmit the lower-priority data packet using the second resource grant.

Figure 16:
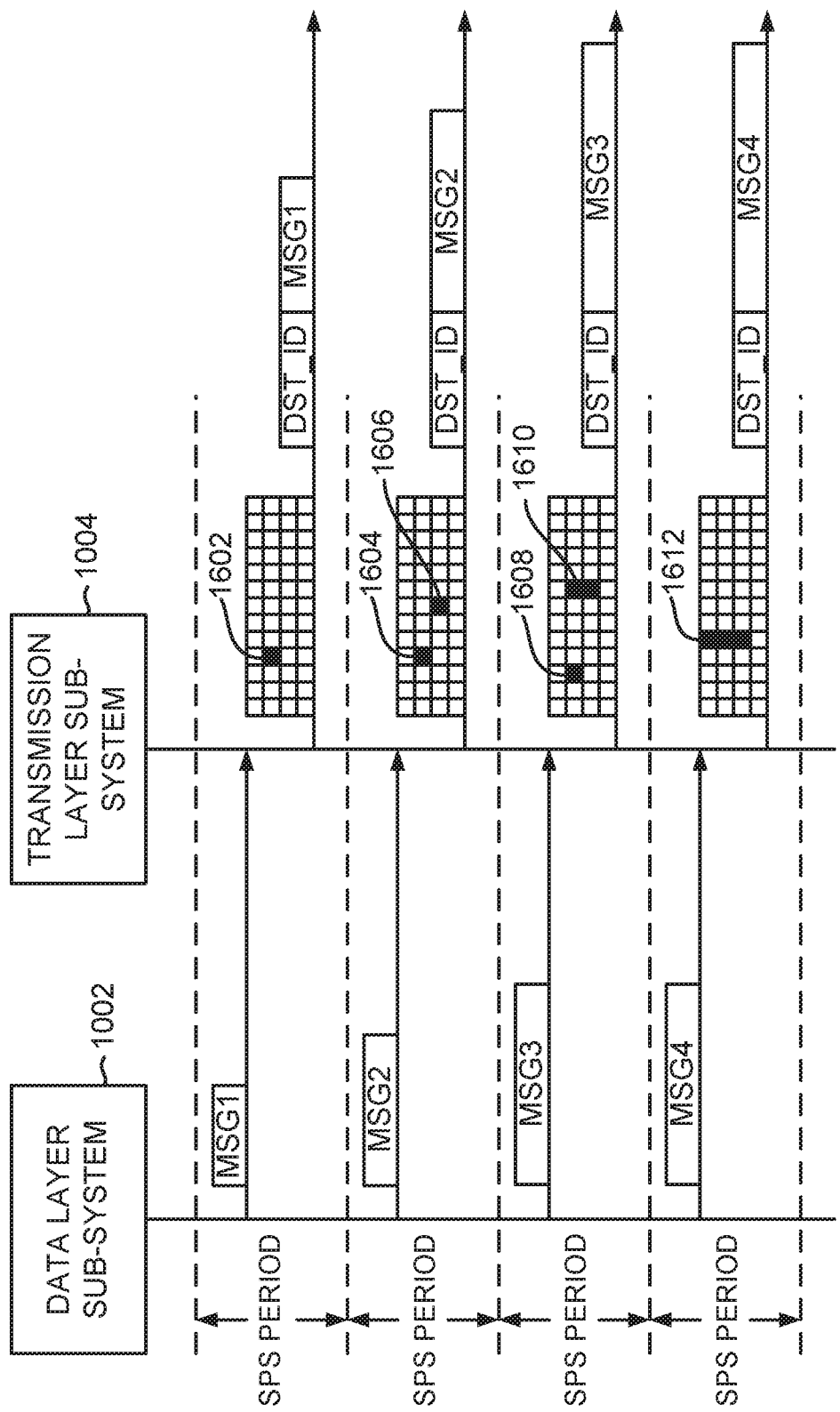
FIG. 16 is a call flow diagram illustrating an example of resource grant size adaptation in uplink communication, in accordance with various aspects of the present disclosure.

FIG. 16 illustrates an example of a technique that may be referred to as "adaptive grant request." In the example illustrated in FIG. 16, the data packets to be transmitted by the UE are periodic. Thus, the UE may schedule the data packets to be transmitted in accordance with SPS techniques. In the example illustrated in FIG. 16, data-layer subsystem 1002 provides one message or data packet per SPS period (e.g., 10 ms), such as MSG1, MSG2, MSG, and MSG4. In accordance with SPS principles, the size of the resource grant that the UE provides each SPS period may have been established in response to an initial resource request based on an initial packet size estimate, such as 1 byte. MSG1, received in a first SPS period, may have a size of 1 byte. As a resource grant identifying a resource element 1602 sufficient to transmit 1 byte may have been provided in association with the first SPS period in response to the initial resource request, transmission-layer subsystem 1004 may schedule transmission of MSG1 using resource element 1602. This scheduled transmission may include MSG1 actually being transmitted using resource element 1602 during the same SPS period in which MSG1 was received in the output buffer (from data-layer subsystem 1002).

In the next or second SPS period in this example, the received MSG2 may have a size of 2 bytes. As a resource grant identifying a resource element 1604 received in association with the second SPS period in response to the initial resource request is not sufficient to transmit 2 bytes, a mis-match has occurred between packet size and resource grant size. In response to detecting this first instance of a mis-match, transmission-layer subsystem 1004 may allocate (for this SPS period only) additional resources in association with MSG2 for an additional byte. The resource grant associated with MSG2 plus the additional allocation may identify resource elements 1604 and 1606, which are together sufficient to transmit MSG2. Transmission-layer subsystem 1004 may schedule transmission of MSG2 using resource elements 1604 and 1606. This scheduled transmission may include MSG2 actually being transmitted using resource elements 1604 and 1606 during the same SPS period in which MSG2 was received in the output buffer.

In the next or third SPS period in this example, the received MSG3 may have a size of 3 bytes. As a resource grant identifying a resource element 1608 provided in association with the third SPS period in response to the initial resource request is not sufficient to transmit 3 bytes, a mis-match has occurred between packet size and resource grant size. In response to detecting this second instance of a mis-match, transmission-layer subsystem 1004 may again allocate (for this SPS period only) additional resources in association with MSG3 for an additional two bytes. The resource grant associated with MSG3 plus the additional allocation may identify resource elements 1608 and 1610, which are together sufficient to transmit MSG3. Transmission-layer subsystem 1004 may schedule transmission of MSG3 using resource elements 1608 and 1610. This scheduled transmission may include MSG3 actually being transmitted using resource elements 1608 and 1610 during the same SPS period in which MSG3 was received in the output buffer.

In the example illustrated in FIG. 16, the pattern of repeated mis-matches between data packet size and resource grant size over a number of successive SPS periods indicates that it may be beneficial for the UE to request a larger grant size than it initially requested for the SPS data flow. In accordance with an adaptive grant request method, transmission-layer subsystem 1004 may detect such a pattern of repeated mis-matches between data packet size and resource grant size over a number of SPS periods and provide a new or replacement resource grant for the SPS data flow that supersedes or replaces the initial resource grant for the SPS data flow. For example, the UE may provide a new grant size that is a percentage of a maximum grant size, such as, for example, 80% of a maximum grant size. In response to the new resource request for the SPS data flow, the UE may provide a resource grant each SPS period that reflects the new size. Any resource elements that are not re-used in the replacement resource grant may be returned to the resource pool.

In the example illustrated in FIG. 16, in a fourth SPS period that is subsequent to the UE providing the new or replacement resource grant, the received MSG4 may have a size of 3 bytes. In this example, the new or replacement resource grant identifying resource elements 1612 is sufficient to transmit 3 bytes. Accordingly, transmission-layer subsystem 1004 may schedule transmission of MSG4 using resource elements 1612.

Figure 17:
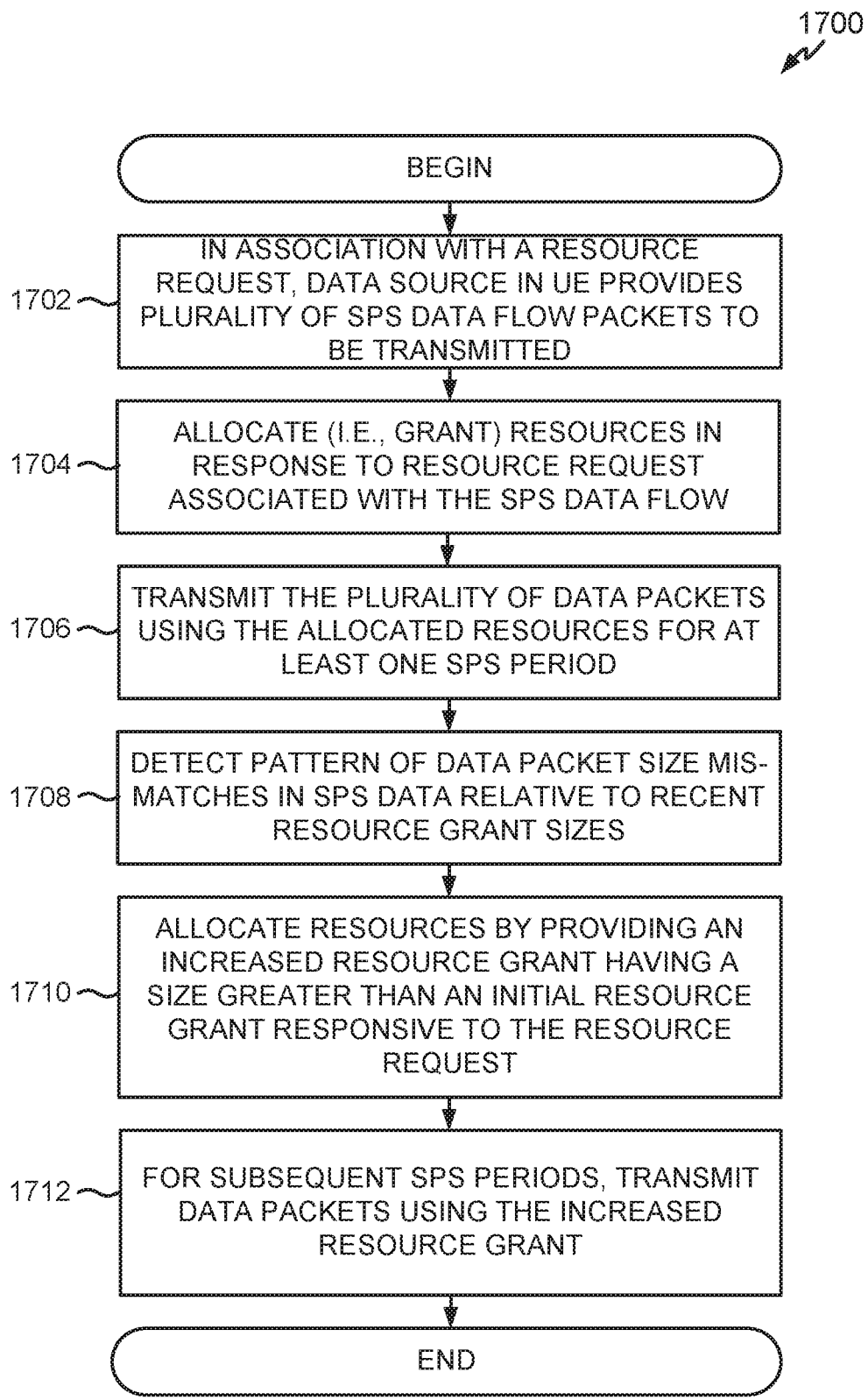
FIG. 17 is a flow diagram illustrating an example of a method for resource grant size adaptation in uplink communication, in accordance with various aspects of the present disclosure.

FIG. 17 illustrates an exemplary adaptive grant request method 1700. Method 1700 may be an example of method 900 (FIG. 9). As indicated by block 1702, a data source in the UE may provide a resource request for a plurality of SPS data packets to be transmitted. The resource request may indicate the SPS period. In association with the resource request, the data source may provide a plurality of data packets to be transmitted. As the data flow is SPS, the data source may provide the plurality of data packets at intervals of the SPS period. That is, during each of one or more SPS periods, the data source provides at least one data packet.

As indicated by block 1704, in response to the resource request and data packets provided by the data source, the resource-allocating entity in the UE may provide one or more initial resource grants. As indicated by block 1706, the UE may transmit the data packets for at least one SPS period using the initial resource grants.

As indicated by block 1708, the UE may subsequently detect a pattern of mis-matches between data packet size and resource grant size over a number of recent SPS periods. As indicated by block 1710, the UE may re-allocate resources by replacing the initial resource grant for the SPS data flow with an increased resource grant having a larger size than the initial resource grant. The larger size may be a predetermined value, such as a percentage of a maximum grant size.

As indicated by block 1712, for subsequent SPS periods, the UE may transmit the data packets using the increased resource grant.

Figure 18:
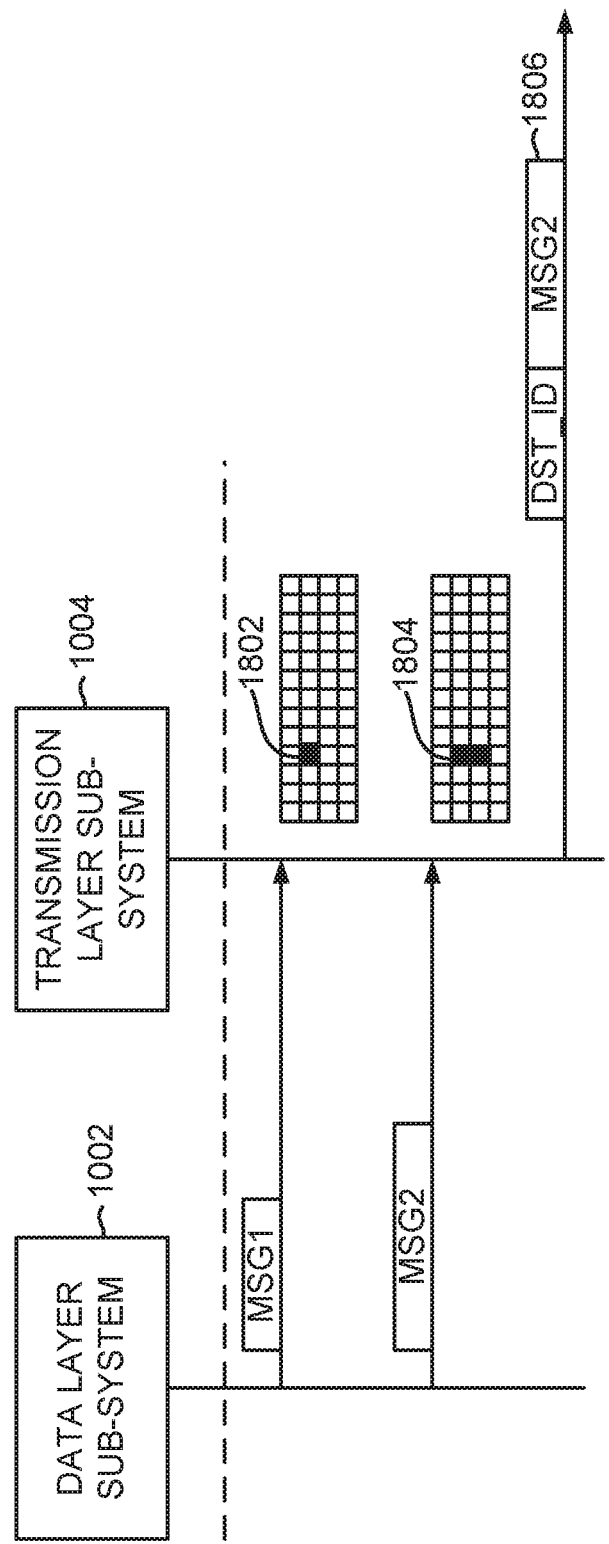
FIG. 18 is a call flow diagram illustrating an example of flow control on lower priority messages in uplink communication, in accordance with various aspects of the present disclosure.

FIG. 18 illustrates an example of a technique that may be referred to as "flow control" on lower-priority messages. In the example illustrated in FIG. 18, the data packets to be transmitted by the may be event-driven, periodic, or a combination of event-driven and periodic. In this example, data-layer subsystem 1002 provides a first message or data packet MSG1 and a second data packet MSG2, which may be momentarily stored concurrently with each other in the output buffer. MSG1 may have a size of 5 bytes, a delay budget of 10 ms, and a priority level of 2 (as indicated by a priority level parameter). MSG2 may have a size of 10 bytes, a delay budget of 10 ms, and a priority level of 0 (which is a higher priority level than 2). Transmission-layer subsystem 1004 may provide a first resource grant of 5 bytes in association with MSG1 and a second resource grant of 10 bytes in association with MSG2. The first resource grant associated with MSG1 may identify resource element 1802 in this example, which is insufficient to transmit 5 bytes. The granted resource element 1802 may be insufficient, i.e., less than the requested amount of bandwidth, due to a poor channel conditions or other reasons. The second resource grant associated with MSG2 may identify resource elements 1804 in this example, which are sufficient to transmit 10 bytes. In this example, the relative priorities of MSG1 and MSG2 are characterized by, their respective delay level parameters, and MSG2 has a higher priority level than MSG1.

In accordance with a flow control method, transmission-layer subsystem 1004 may detect a pattern of a lower-priority data packet and a higher-priority data packet in the output buffer, but insufficient resources granted to transmit both data packets. In response to detecting such a pattern, transmission-layer subsystem 1004 may schedule the higher-priority data packet for transmission while deferring transmission of the lower-priority data packet. In the example illustrated in FIG. 18, transmission-layer subsystem 1004 may schedule MSG2 for transmission in a TB 1806 using resource elements 1804.

Figure 19:
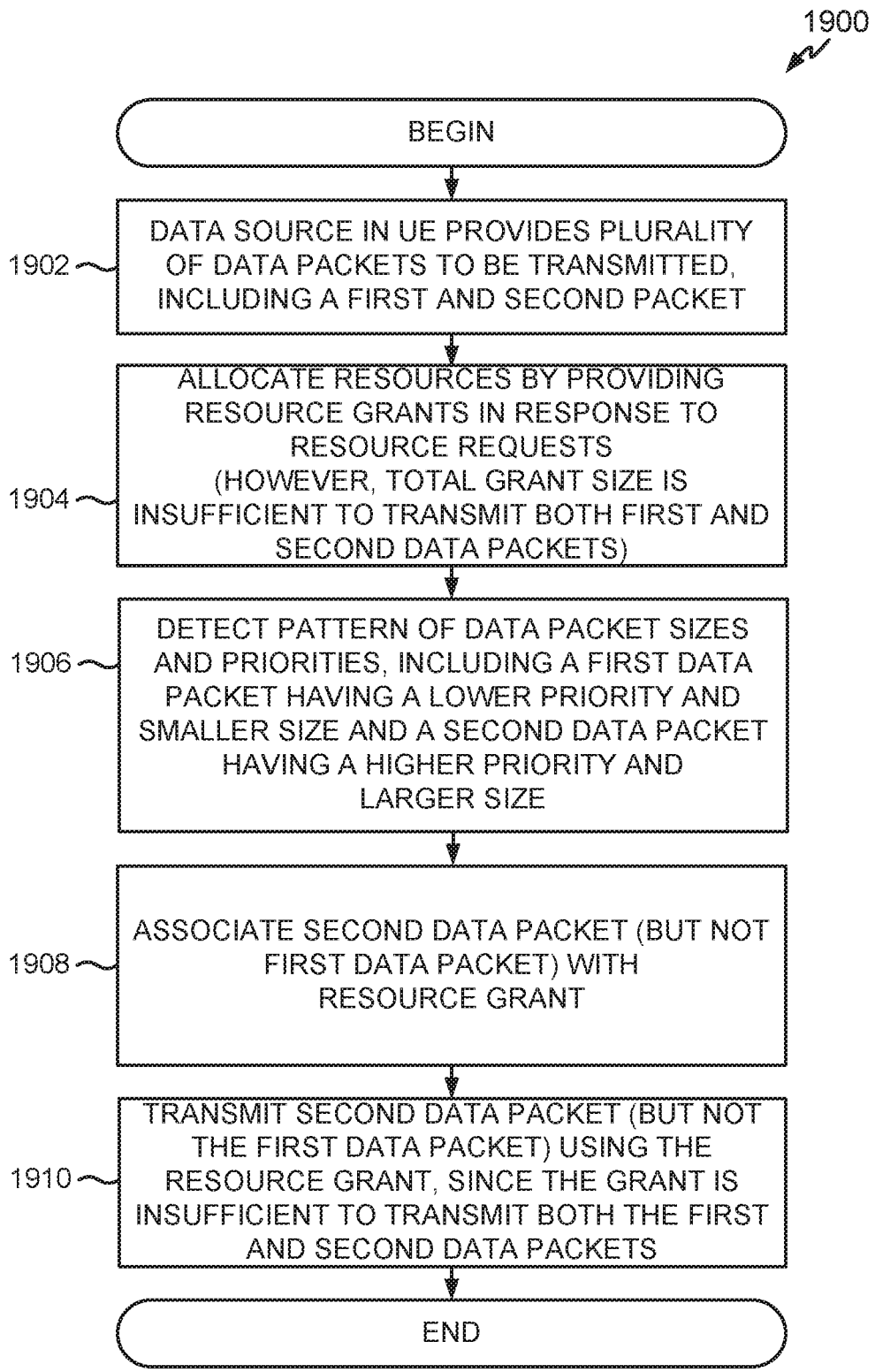
FIG. 19 is a flow diagram illustrating an example of a method for flow control on lower priority messages in uplink communication, in accordance with various aspects of the present disclosure.

FIG. 19 illustrates an exemplary flow control method 1900. Method 1900 may be an example of method 900 (FIG. 9). As indicated by block 1902, in association with a plurality of resource requests a data source in the UE may provide a plurality of data packets to be transmitted. For example, the UE may provide a first data packet and a second data packet. The first data packet may have a lower priority and a smaller size, and the second data packet may have a higher priority and a larger size than the first.

As indicated by block 1904, in response to a resource request, the resource-allocating entity in the UE may provide one or more resource grants. The one or more grants together define a total grant size, i.e., capacity to transmit all data packets then in the buffer. However, as indicated by block 1906, the UE may detect a pattern of data packet sizes and priorities that includes a first data packet having a lower priority and a smaller size in relation to the total grant size, and a second data packet having a higher priority and a larger size in relation to the total grant size. That is, the total or combined size of the first and second resource grants is insufficient to transmit both the first and second data packets. As indicated by block 1908, the UE may associate the higher-priority second data packet with resources corresponding to the one of the first and second resource grants that are sufficient to transmit the higher-priority data packet. As indicated by block 1910, the UE may transmit only the second (i.e., higher-priority) data packet using the associated resource grant, as the resource grant a size is insufficient to transmit both the first and second data packets. The UE may defer transmission of the lower-priority first data packet until such time as additional resources may be allocated.

Figure 20:
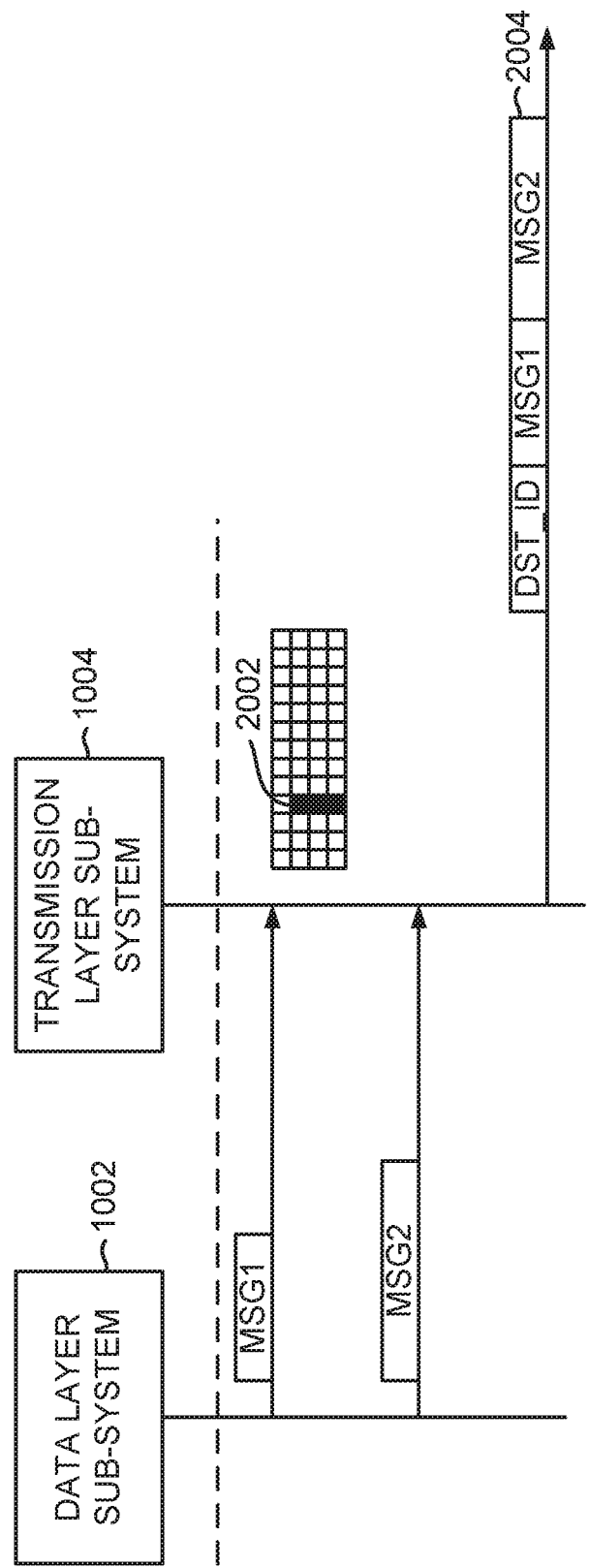
FIG. 20 is a call flow diagram illustrating an example of packet bundling in uplink communication, in accordance with various aspects of the present disclosure.

FIG. 20 illustrates an example of a technique that may be referred to as "bundling" packets with the same destination address in the example illustrated in FIG. 20, the data packets to be transmitted by the UE may be event-driven, periodic, or a combination of event-driven and periodic. In this example, data-layer subsystem 1002 provides a first message or data packet MSG1 and a second data packet MSG2 having the same destination address (DST_ID). MSG1 and MSG2 may be momentarily stored concurrently with each other in the output buffer. MSG1 may have a size of 5 bytes, and MSG2 may have a size of 10 bytes. In response to a first resource request associated with MSG1, transmission-layer subsystem 1004 may provide a first resource grant of 5 bytes. Although only bandwidth sufficient to transmit 5 bytes was requested, the resource grant responsive to the resource request associated with MSG1 may identify resource elements 2002 in this example that are sufficient to transmit 15 bytes. As resource elements 2002 are sufficient to transmit both MSG1 and MSG2, and as MSG1 and MSG2 have the same destination address, transmission-layer subsystem 1004 need not respond to a second resource request associated with MSG2. Thus, transmission-layer subsystem 1004 may detect a pattern of multiple data packets having the same destination as each other in the output buffer, and sufficient resources having been granted to transmit collective data packets. In the example illustrated in FIG. 20, in response to detecting such a pattern, transmission-layer subsystem 1004 may bundle MSG1 and MSG2 together in the same TB 2004 using the resource elements 2002.

Figure 21:
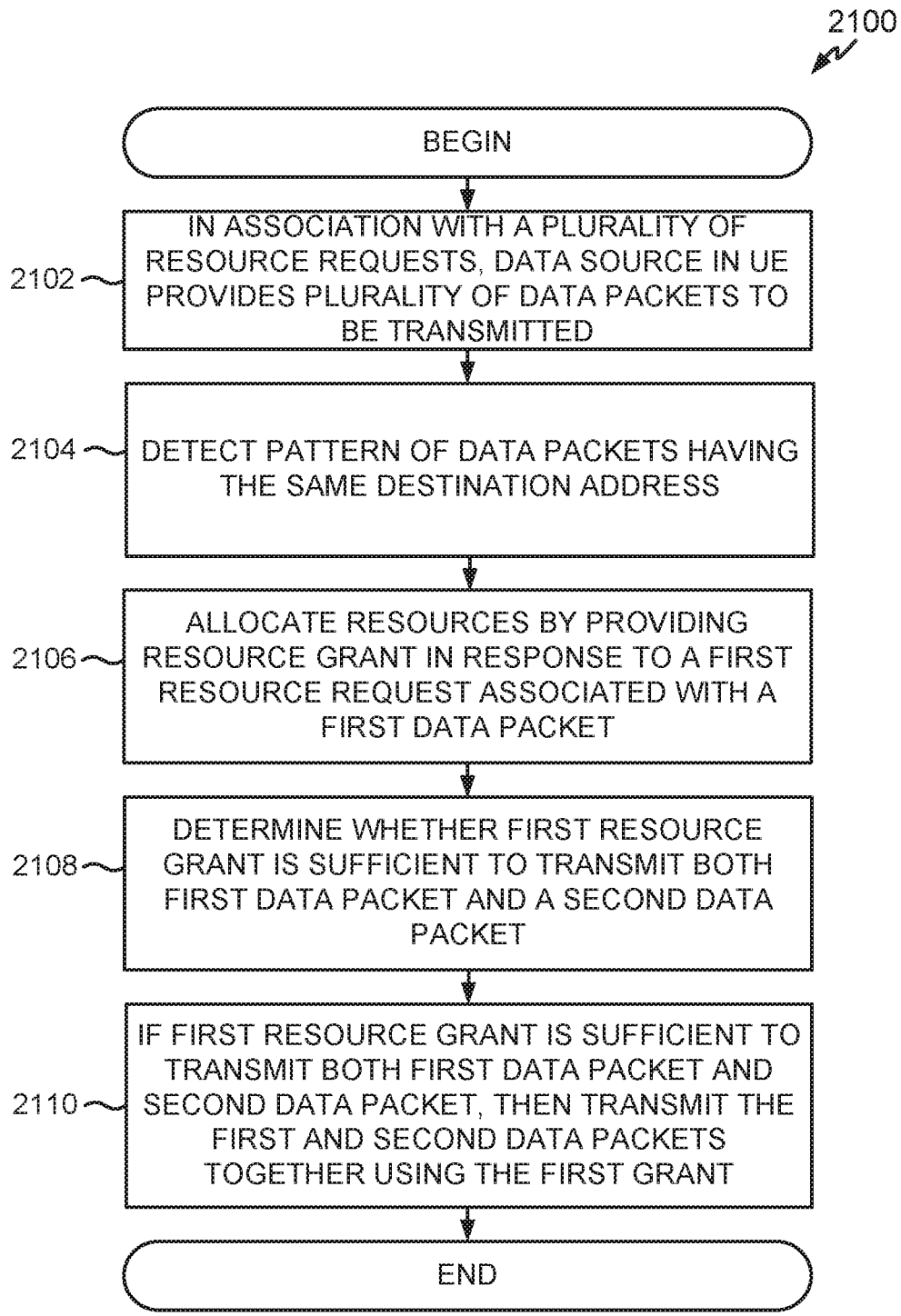
FIG. 21 is a flow diagram illustrating an example of a method for packet bundling in uplink communication, in accordance with various aspects of the present disclosure.

FIG. 21 illustrates an exemplary data packet bundling method 2100. Method 2100 may be an example of method 900 (FIG. 9). As indicated by block 2102, in association with a plurality of resource requests a data source in the UE may provide a plurality of data packets to be transmitted.

As indicated by block 2104, the UE may detect a pattern of multiple data packets having the same destination as each other in the output buffer. As indicated by block 2106, in response to a first one of the resource requests, the UE may provide a first resource grant. As indicated by block 2108, the LIE may determine whether the first resource grant is sufficient to transmit not only the first data packet but also a second data packet. As indicated by block 2110, if the UE determines that the first resource grant is sufficient to transmit not only the first data packet but also the second data packet, the UE transmits the first and second data packets together (e.g., in the same TB) using only the first grant. In such a case, the UE may not respond to the resource request associated with the second data packet.

Figure 22:
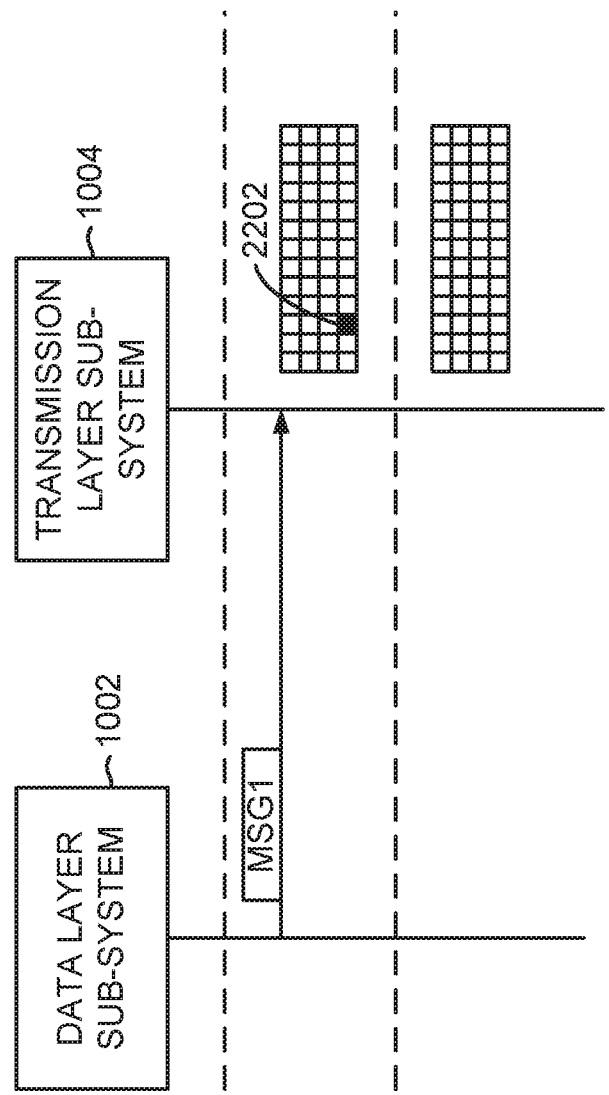
FIG. 22 is a call flow diagram illustrating an example of transmission canceling in uplink communication, in accordance with various aspects of the present disclosure.

FIG. 22 illustrates an example of a technique that may be referred to as "transmission canceling." In the example illustrated in FIG. 22, the data packets to be transmitted by the UE may be event-driven, periodic, or a combination of event-driven and periodic. In this example, data-layer subsystem 1002 provides a first message or data packet MSG1 having a delay budget. Transmission-layer subsystem 1004 may provide a first resource grant in association with MSG1. A resource grant associated with MSG1 may identify resource elements 2202 that are sufficient to transmit MSG1. Transmission-layer subsystem 1004 therefore may associate the resources identified by the first resource grant with MSG1 and otherwise schedule MSG1 for transmission in a TB. However, in this example, the delay budget of MSG1 expires before MSG1 is actually transmitted. In the example illustrated in FIG. 20, in response to detecting the delay budget expiration of a sole data packet remaining in the output buffer, transmission-layer subsystem 1004 may cancel the transmission, as there is no longer any immediate use for the granted resources. Transmission-layer subsystem 1004 may return the unused resources to the resource pool.

In a similar example of transmission canceling, a transmission may be only, partially "canceled," by shrinking the transport block (TB) size. In an example, data-layer subsystem 1002 may provide a first message or data packet MSG1 having a delay budget and a second message or data packet MSG2 (not shown) having another delay budget. Transmission-layer subsystem 1004 may provide a total resource grant in association with MSG1 and MSG2 that is sufficient to transmit both MSG1 and MSG2. Accordingly, transmission-layer subsystem 1004 may associate the resources identified by the resource grant with MSG1 and MSG2 and otherwise schedule MSG1 and MSG2 for transmission together in a TB. However, in this example, the delay budget of MSG1 expires before the TB is actually transmitted. In response to detecting the delay budget expiration of MSG1, transmission-layer subsystem 1004 may in effect, shrink the TB, as there is no longer any immediate use for the granted resources associated with MSG1. Transmission-layer subsystem 1004 may proceed with transmitting MSG2 in the smaller TB, and return the unused portion of the granted resources to the resource pool.

Figure 23:
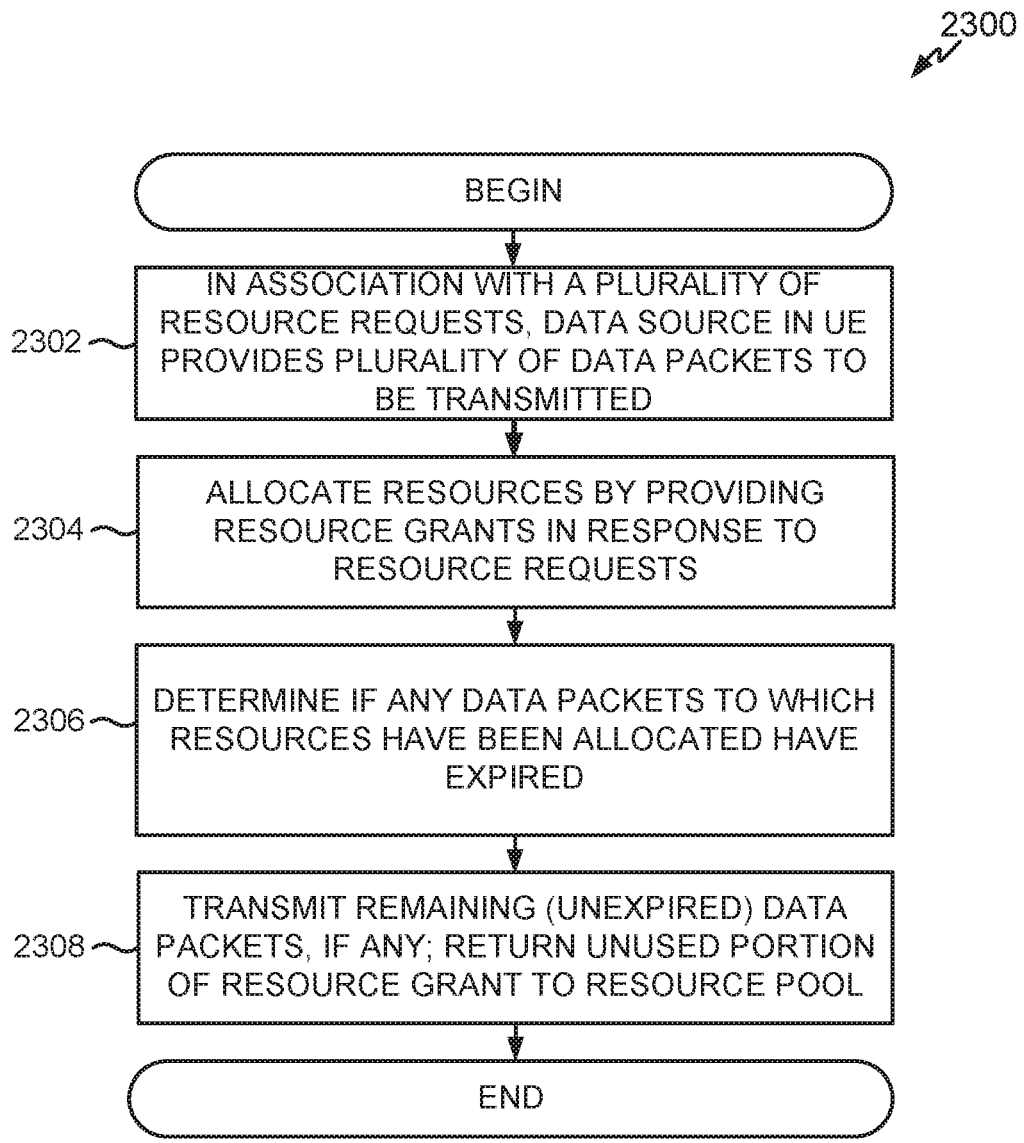
FIG. 23 is a flow diagram illustrating an example of a method for transmission canceling in uplink communication, in accordance with various aspects of the present disclosure.

FIG. 23 illustrates an exemplary transmission canceling method 2300. Method 2300 may be an example of method 900 (FIG. 9). As indicated by block 2302, in association with a plurality of resource requests a data source in the UE may provide a plurality of data packets to be transmitted. As indicated by block 2304, in response to the one or more resource requests, the resource-allocating entity in the UE may provide one or more resource grants. As indicated by block 2306, the UE may determine whether any data packets to which resources have been allocated have expired. The UE may return any resource grant or portion of a resource grant associated with an expired data packet to the resource pool. As indicated by block 2308, the UE may transmit any remaining (i.e., unexpired) data packets using a remaining resource grant or portion of a resource grant.

It should be understood that for purposes of clarity FIGS. 10, 12, 14, 16, 18, 20, and 22 each represent a snapshot or instance of an example of operation of the UE, involving only a small number of exemplary data packets, and that data-layer subsystem 1002 may provide many more such data packets. Depending on the use case under which the UE is operating, data packets may be periodic or event-driven. Transmission-layer subsystem 1004 may respond to the data packets by, for example, detecting a pattern relating to UL transmission of the data packets and scheduling transmission of the data packets based on a detected pattern. Depending upon the detected pattern, transmission-layer subsystem 1004 may schedule transmission of the data packets using any of the methods described in this disclosure. In an instance in which transmission-layer subsystem 1004 does not detect a pattern relating to UL transmission of the data packets, transmission-layer subsystem 1004 the data packets using conventional methods.

Although certain acts or steps in the methods described above naturally precede others for the exemplary embodiments to operate as described, a method is not limited to the above-described order of those acts or steps if such order or sequence does not alter the functionality of the method. That is, it is recognized that regardless of the order in which acts or steps may be indicated in a flow diagram or otherwise described in this disclosure, some acts or steps may be performed before, after, or in parallel (i.e., substantially simultaneously) with other acts or steps, in various other ways, without departing from the scope and spirit of the disclosure. In some instances, certain acts or steps described above may be omitted or not performed, without departing from the scope and spirit of the disclosure.

Figure 24:
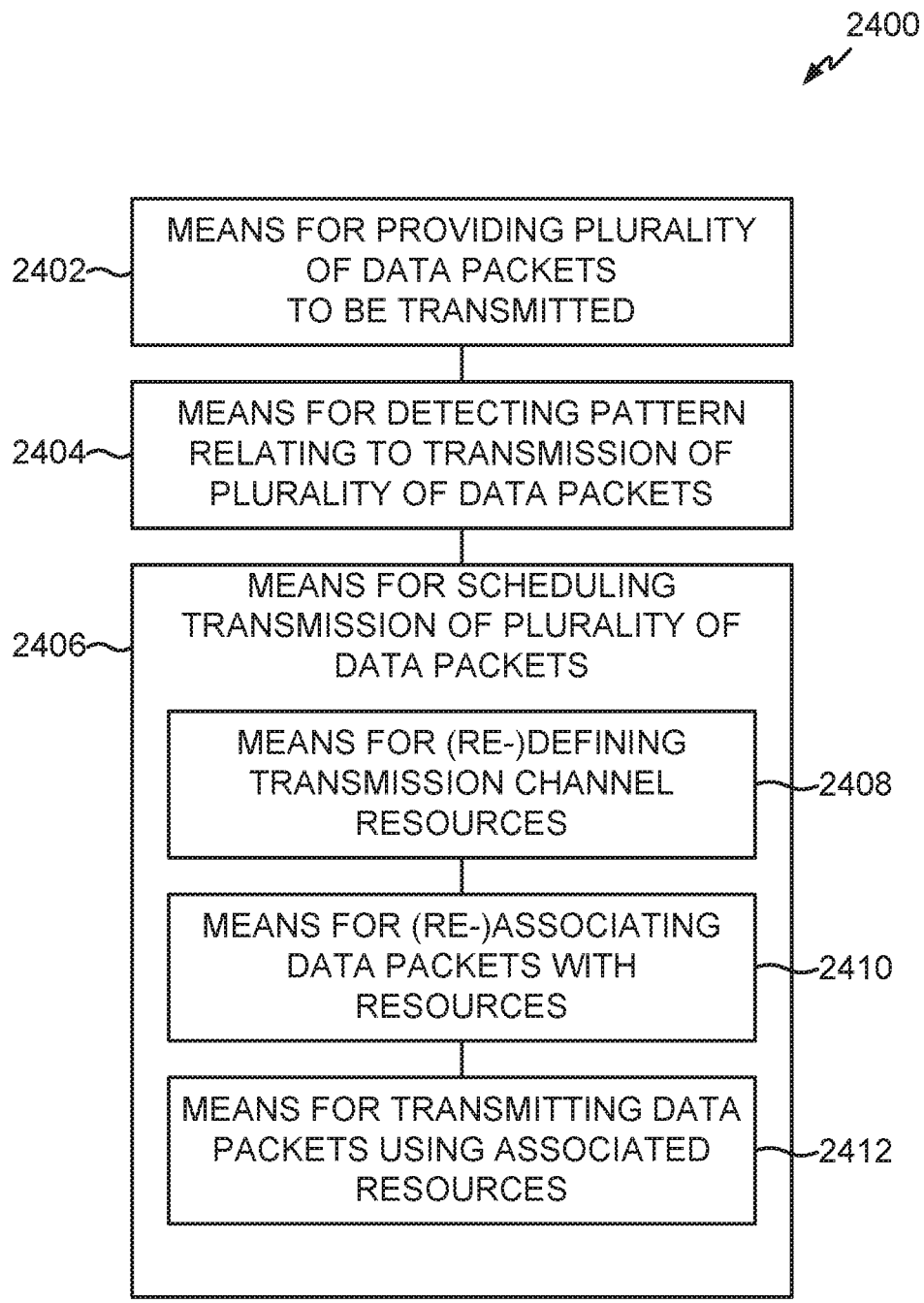
FIG. 24 is a functional block diagram of an apparatus for uplink communication, in accordance with various aspects of the present disclosure.

FIG. 24 is a functional block diagram of an apparatus 2400 for UL communication, in accordance with various aspects of the present disclosure. The apparatus 2400 comprises means 2402 for providing a plurality of data packets to be transmitted, means 2404 for detecting a pattern relating to transmission of the plurality of data packets, and means 2406 for scheduling transmission of the plurality of data packets. The means 2406 for scheduling may include means 2408 for defining (or re-defining) transmission channel resources, means 2410 for association (or re-associating) data packets with resources, and means 2412 for transmitting data packets using the associated resources.

Techniques described in this disclosure may be used for various wireless communications systems such as CDMA, TDMA, OFDMA, SC-FDMA, and other systems. The terms "system" and "network" are often used interchangeably. A CDMA system may implement a radio technology such as CDMA2000, Universal Terrestrial Radio Access (UTRA), etc., CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd. Generation Partnership Project 2" (3GPP2). The techniques described in this disclosure may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure in this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described in this disclosure. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described in this disclosure may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used in this disclosure, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used in this disclosure, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and non-transitory communication media, including any non-transitory medium that facilitates transfer of a computer program from one place to another. A storage medium may be any available non-transitory medium that can be accessed by a general purpose or special purpose computer. By way of example, and not limitation, non-transitory computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used in this disclosure, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of non-transitory computer-readable media.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having more data packets (e.g., data from one component interacting with another component in a local system, distributed system, and/or across a network such as the Internet with other systems by way of the signal).

The previous description of the disclosure is provided to enable a person skilled in the art to make or use the disclosure. Various modifications to the disclosure will be readily apparent to those skilled in the art, and the generic principles defined in this disclosure may be applied to other variations without departing from the scope of the disclosure. Thus, the disclosure is not to be limited to the examples and designs described above but is to be accorded the broadest scope consistent with the principles and novel features disclosed.

What is claimed is:

1. A method for communication by a wireless communication system user equipment (UE), comprising:
    providing at periodic time intervals a plurality of data packets by a data source in the UE in association with a resource request;
    providing an initial periodic resource grant in response to the resource request;
    transmitting, during each of a first plurality of the periodic time intervals, each of the plurality of data packets in a corresponding one of a plurality of transport blocks using the initial periodic resource grant;
    detecting, over the first plurality of the periodic time intervals, a pattern of sizes of the plurality of data packets;
    providing, in response to a detected pattern of data packet sizes, an increased periodic resource grant having a greater size than the initial periodic resource grant; and
    transmitting, during each of a second plurality of the periodic time intervals, the plurality of data packets aggregated together in a single transport block using the increased periodic resource grant.

2. The method of claim 1, further comprising:
    providing a first data packet in an output buffer by the data source in association with a first resource request;
    providing a second data packet in the output buffer by the data source in association with a second resource request;

providing a first resource grant in response to the first resource request;
providing a second resource grant in response to the second resource request;
detecting a pattern based on a size of the first data packet and a size of the second data packet;
providing, in response to a detected pattern of sizes of the first and second data packets, an increased resource grant having a greater size than the size of the first data packet and the size of the second data packet; and
transmitting the first and second data packets aggregated together in a single transport block using the increased resource grant.

3. The method of claim 1, further comprising:
providing a lower-priority data packet by the data source in association with a first resource request;
providing a higher-priority data packet by the data source in association with a second resource request;
providing a first resource grant associated with the lower-priority data packet and a second resource grant associated with the higher-priority data packet; and
transmitting the higher-priority data packet using the first resource grant and transmitting the lower-priority data packet using the second resource grant.

4. The method of claim 1, further comprising:
detecting, over the first plurality of the periodic time intervals, a pattern of data packets of increasing size and corresponding periodic resource grants of insufficient size to transmit the data packets of increasing size, wherein the increased periodic resource grant is provided in response to a detected pattern of data packets of increasing size and corresponding periodic resource grants of insufficient size to transmit the data packets of increasing size; and
transmitting, during each of a third plurality of the periodic time intervals, a data packet using the increased periodic resource grant.

5. The method of claim 1, further comprising:
providing a first data packet in an output buffer by the data source in association with a first resource request;
providing a second data packet in the output buffer by the data source in association with a second resource request, the second data packet having a higher priority and a larger size than the first data packet;
providing a first resource grant in response to the first resource request, the first resource grant having a size sufficient to transmit the first data packet and insufficient to transmit the first data packet and the second data packet;
providing a second resource grant in response to the second resource request, the second resource grant having a size sufficient to transmit the second data packet and insufficient to transmit the second data packet and the first data packet;
detecting a pattern of the second data packet having the higher priority and the larger size than the first data packet; and
while deferring transmission of the first data packet, transmitting the second data packet using the second resource grant.

6. The method of claim 1, further comprising:
providing a first data packet in an output buffer by the data source in association with a first resource request, the first data packet having a destination address;
providing a second data packet in the output buffer by the data source, the second data packet having the destination address;
providing a resource grant in response to the first resource request;
detecting the first and second data packets share the destination address and the resource grant has a size sufficient to transmit the first and second data packets; and
transmitting the first and second data packets aggregated together in a single transport block in response to detecting the first and second data packets share the destination address and the size of the resource grant is sufficient to transmit the first and second data packets.

7. The method of claim 1, further comprising:
providing a plurality of data packets in an output buffer by the data source in association with a corresponding plurality of resource requests, each data packet having a delay budget;
detecting expiry of the delay budget of at least one data packet to which resources have been allocated;
refraining from transmitting the at least one data packet in response to detecting expiry of the delay budget; and
return the resources to a resource pool.

8. A system for communication by a wireless communication system user equipment (UE), comprising:
a data-layer subsystem having a data source configured to provide at periodic time intervals a plurality of data packets for transmission in association with a resource request;
a transmission-layer subsystem having uplink path circuitry and operable under control of at least one processing system, the at least one processing system configured to:
provide an initial periodic resource grant in response to the resource request;
transmit, during each of a first plurality of the periodic time intervals, each of the plurality of data packets in a corresponding one of a plurality of transport blocks using the initial periodic resource grant;
detect, over the first plurality of the periodic time intervals, a pattern of sizes of the plurality of data packets;
provide, in response to a detected pattern of data packet sizes, an increased periodic resource grant having a greater size than the initial periodic resource grant; and
transmit, during each of a second plurality of the periodic time intervals, the plurality of data packets aggregated together in a single transport block using the increased periodic resource grant.

9. The system of claim 8, wherein the at least one processing system is further configured to:
provide a first data packet in an output buffer by the data source in association with a first resource request;
provide a second data packet in the output buffer by the data source in association with a second resource request;
provide a first resource grant in response to the first resource request;
provide a second resource grant in response to the second resource request;
detect a pattern based on a size of the first data packet and a size of the second data packet;
provide, in response to a detected pattern of sizes of the first and second data packets, an increased resource grant having a greater size than the size of the first data packet and the size of the second data packet; and transmit the first and second data packets aggregated together in a single transport block using the increased resource grant.

10. The system of claim 8, wherein the at least one processing system is further configured to:
provide a lower-priority data packet by the data source in association with a first resource request;
provide a higher-priority data packet by the data source in association with a second resource request;
provide a first resource grant associated with the lower-priority data packet and a second resource grant associated with the higher-priority data packet; and
transmit the higher-priority data packet using the first resource grant and transmitting the lower-priority data packet using the second resource grant.

11. The system of claim 8, wherein the at least one processing system is further configured to:
detect, over the first plurality of the periodic time intervals, a pattern of data packets of increasing size and corresponding periodic resource grants of insufficient size to transmit the data packets of increasing size, wherein the increased periodic resource grant is provided in response to a detected pattern of data packets of increasing size and corresponding periodic resource grants of insufficient size to transmit the data packets of increasing size; and
transmitting, during each of a third plurality of the periodic time intervals, a data packet using the increased periodic resource grant.

12. The system of claim 8, wherein the at least one processing system is further configured to:
provide a first data packet in an output buffer by the data source in association with a first resource request;
provide a second data packet in the output buffer by the data source in association with a second resource request, the second data packet having a higher priority and a larger size than the first data packet;
provide a first resource grant in response to the first resource request, the first resource grant having a size sufficient to transmit the first data packet and insufficient to transmit the first data packet and the second data packet;
provide a second resource grant in response to the second resource request, the second resource grant having a size sufficient to transmit the second data packet and insufficient to transmit the second data packet and the first data packet;
detect a pattern of the second data packet having the higher priority and the larger size than the first data packet; and
while deferring transmission of the first data packet, transmitting the second data packet using the second resource grant.

13. The system of claim 8, wherein the at least one processing system is further configured to:
provide a first data packet in an output buffer by the data source in association with a first resource request, the first data packet having a destination address;
providing a second data packet in the output buffer by the data source, the second data packet having the destination address;
provide a resource grant in response to the first resource request;
detect the first and second data packets share the destination address and the resource grant has a size sufficient to transmit the first and second data packets; and transmit the first and second data packets aggregated together in a single transport block in response to detecting the first and second data packets share the destination address and the size of the resource grant is sufficient to transmit the first and second data packets.

14. The system of claim 8, wherein the at least one processing system is further configured to:
provide a plurality of data packets in an output buffer by the data source in association with a corresponding plurality of resource requests, each data packet having a delay budget;
detect expiry of the delay budget of at least one data packet to which resources have been allocated; and
refrain from transmitting the at least one data packet in response to detecting expiry of the delay budget; and
return the resources to a resource pool.

15. A device for communication by a wireless communication system user equipment (UE), comprising:
means for providing at periodic time intervals a plurality of data packets by a data source in the UE in association with a resource request;
means for providing an initial periodic resource grant in response to the resource request;
means for transmitting, during each of a first plurality of the periodic time intervals, each of the plurality of data packets in a corresponding one of a plurality of transport blocks using the initial periodic resource grant;
means for detecting, over the first plurality of the periodic time intervals, a pattern of sizes of the plurality of data packets;
means for providing, in response to a detected pattern of data packet sizes, an increased periodic resource grant having a greater size than the initial periodic resource grant; and
means for transmitting, during each of a second plurality of the periodic time intervals, the plurality of data packets aggregated together in a single transport block using the increased periodic resource grant.

16. The device of claim 15, further comprising:
means for providing a first data packet in an output buffer by the data source in association with a first resource request;
means for providing a second data packet in the output buffer by the data source in association with a second resource request;
means for providing a first resource grant in response to the first resource request;
means for providing a second resource grant in response to the second resource request;
means for detecting a pattern based on a size of the first data packet and a size of the second data packet;
means for providing, in response to a detected pattern of sizes of the first and second data packets, an increased resource grant having a greater size than the size of the first data packet and the size of the second data packet; and
means for transmitting the first and second data packets aggregated together in a single transport block using the increased resource grant.

17. The device of claim 15, further comprising:
means for providing a lower-priority data packet by the data source in association with a first resource request;
means for providing a higher-priority data packet by the data source in association with a second resource request;

means for providing a first resource grant associated with the lower-priority data packet and a second resource grant associated with the higher-priority data packet; and means for transmitting the higher-priority data packet using the first resource grant and transmitting the lower-priority data packet using the second resource grant.

18. The device of claim 15, further comprising:

means for detecting, over the first plurality of the periodic time intervals, a pattern of data packets of increasing size and corresponding periodic resource grants of insufficient size to transmit the data packets of increasing size, wherein the increased periodic resource grant is provided in response to a detected pattern of data packets of increasing size and corresponding periodic resource grants of insufficient size to transmit the data packets of increasing size; and means for transmitting, during each of a third plurality of the periodic time intervals, a data packet using the increased periodic resource grant.

19. The device of claim 15, further comprising:

means for providing a first data packet in an output buffer by the data source in association with a first resource request;

means for providing a second data packet in the output buffer by the data source in association with a second resource request, the second data packet having a higher priority and a larger size than the first data packet;

means for providing a first resource grant in response to the first resource request, the first resource grant having a size sufficient to transmit the first data packet and insufficient to transmit the first data packet and the second data packet;

means for providing a second resource grant in response to the second resource request, the second resource grant having a size sufficient to transmit the second data packet and insufficient to transmit the second data packet and the first data packet;

means for detecting a pattern of the second data packet having the higher priority and the larger size than the first data packet; and means for, while deferring transmission of the first data packet, transmitting the second data packet using the second resource grant.

20. A non-transitory computer-readable medium storing computer executable code for uplink communication by a wireless communication system user equipment (UE), the code executable by at least one processor of the UE to:

provide at periodic time intervals a plurality of data packets by a data source in the UE in association with a resource request;

provide an initial periodic resource grant in response to the resource request;

transmit, during each of a first plurality of the periodic time intervals, each of the plurality of data packets in a corresponding one of a plurality of transport blocks using the initial periodic resource grant;

detect, over the first plurality of the periodic time intervals, a pattern of sizes of the plurality of data packets;

provide, in response to a detected pattern of data packet sizes, an increased periodic resource grant having a greater size than the initial periodic resource grant; and transmit, during each of a second plurality of the periodic time intervals, the plurality of data packets aggregated together in a single transport block using the increased periodic resource grant.

* * * * *